United States Patent
Nose et al.

(10) Patent No.: US 7,206,003 B2
(45) Date of Patent: Apr. 17, 2007

(54) CONTROLLER-DRIVER, DISPLAY DEVICE, AND DISPLAY METHOD

(75) Inventors: Takashi Nose, Kawasaki (JP); Junyou Shioda, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 560 days.

(21) Appl. No.: 10/684,389

(22) Filed: Oct. 15, 2003

(65) Prior Publication Data
US 2004/0080521 A1    Apr. 29, 2004

(30) Foreign Application Priority Data

Oct. 15, 2002 (JP) .............................. 2002/299845
Oct. 9, 2003 (JP) .............................. 2003/350636

(51) Int. Cl.
G09G 5/10 (2006.01)
G06F 12/02 (2006.01)

(52) U.S. Cl. ...................... 345/690; 345/541; 345/544; 345/545; 345/596; 711/153; 711/154; 382/282; 382/284

(58) Field of Classification Search ........ 345/541–547, 345/589, 600, 684, 686, 690, 204, 596, 597, 345/598; 348/647; 711/153, 154; 382/282, 382/284
See application file for complete search history.

(56) References Cited

U.S. PATENT DOCUMENTS

| | | | |
|---|---|---|---|
| 5,390,293 A | | 2/1995 | Nishioka et al. |
| 5,488,385 A | | 1/1996 | Singhal et al. |
| 5,552,800 A | | 9/1996 | Uchikoga et al. |
| 6,084,560 A | * | 7/2000 | Miyamoto .................... 345/89 |
| 6,288,698 B1 | * | 9/2001 | Ishii et al. ..................... 345/87 |
| 6,362,834 B2 | * | 3/2002 | Ishii ........................... 345/690 |
| 6,801,213 B2 | * | 10/2004 | Bergstrom et al. .......... 345/596 |
| 6,903,733 B1 | * | 6/2005 | Greenberg et al. .......... 345/204 |

FOREIGN PATENT DOCUMENTS

| | | |
|---|---|---|
| EP | 0837449 A2 | 4/1998 |
| JP | 7-295937 A | 11/1995 |
| JP | 9-281950 A | 10/1997 |
| JP | 2002-141993 A | 5/2002 |
| TW | 393863 | 6/2000 |

* cited by examiner

Primary Examiner—Henry N. Tran
(74) Attorney, Agent, or Firm—Sughrue Mion, PLLC

(57) ABSTRACT

A controller-driver, a method of driving the controller-driver, and a method of processing image data enabling scroll or other various functions without adding a storage capacity of a display memory nor increasing power consumption. A built-in display memory having a capacity of one frame (H pixels×V pixels×the number of bits) is partitioned into a plurality of memories according to an image type. High order bits are then stored in a first display memory $7a$ and high order bits of the next frame or low order bits are stored in a second display memory $7b$ by using a first selector 8 to a third selector 10 controlled by a memory control circuit 6 before they are read out. Thereby, high-level image data of one frame can be displayed when the scroll function is not used and image data of a plurality of frames can be displayed without accessing an image drawing unit 1 when the scroll function is used, thereby reducing power consumption.

20 Claims, 33 Drawing Sheets

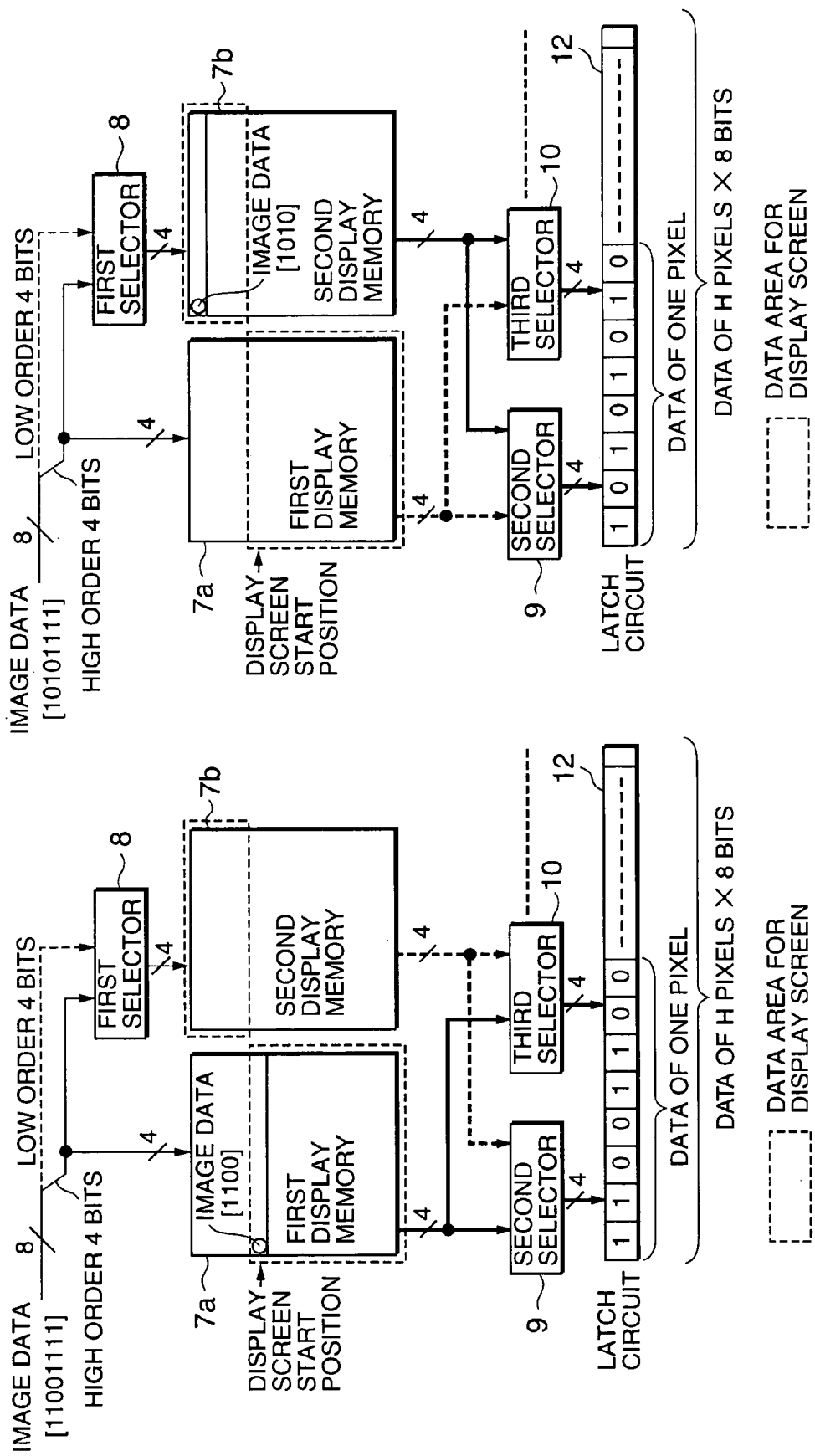

| MEMORY PARTITION SIGNAL (SELECT 1) | MEMORY READ SELECT SIGNAL (SELECT 2) | FIRST SELECTOR OUTPUT | SECOND SELECTOR OUTPUT | THIRD SELECTOR OUTPUT |
|---|---|---|---|---|
| OFF | OFF | LOW ORDER 4 BITS OF IMAGE DATA | — — | — — |
| OFF | ON | LOW ORDER 4 BITS OF IMAGE DATA | DATA STORED IN FIRST DISPLAY MEMORY | DATA STORED IN SECOND DISPLAY MEMORY |
| ON | OFF | HIGH ORDER 4 BITS OF IMAGE DATA | DATA STORED IN FIRST DISPLAY MEMORY | DATA STORED IN FIRST DISPLAY MEMORY |
| ON | ON | HIGH ORDER 4 BITS OF IMAGE DATA | DATA STORED IN SECOND DISPLAY MEMORY | DATA STORED IN SECOND DISPLAY MEMORY |

FIG. 5

| MEMORY PARTITION SIGNAL (SELECT 1) | MEMORY READ SELECT SIGNAL (SELECT 2) | FIRST SELECTOR OUTPUT | SECOND SELECTOR OUTPUT | THIRD SELECTOR OUTPUT | FOURTH SELECTOR OUTPUT |
|---|---|---|---|---|---|
| OFF | OFF | LOW ORDER 4 BITS OF IMAGE DATA | — | — | HIGH ORDER 4 BITS OF IMAGE DATA |
| OFF | ON | LOW ORDER 4 BITS OF IMAGE DATA | DATA STORED IN FIRST DISPLAY MEMORY | DATA STORED IN SECOND DISPLAY MEMORY | HIGH ORDER 4 BITS OF IMAGE DATA |
| ON | OFF | DITHER-PROCESSED IMAGE DATA (HIGH ORDER 4 BITS) | DATA STORED IN FIRST DISPLAY MEMORY | DATA STORED IN FIRST DISPLAY MEMORY | DITHER-PROCESSED IMAGE DATA (HIGH ORDER 4 BITS) |
| ON | ON | DITHER-PROCESSED IMAGE DATA (HIGH ORDER 4 BITS) | DATA STORED IN SECOND DISPLAY MEMORY | DATA STORED IN SECOND DISPLAY MEMORY | DITHER-PROCESSED IMAGE DATA (HIGH ORDER 4 BITS) |

FIG. 9

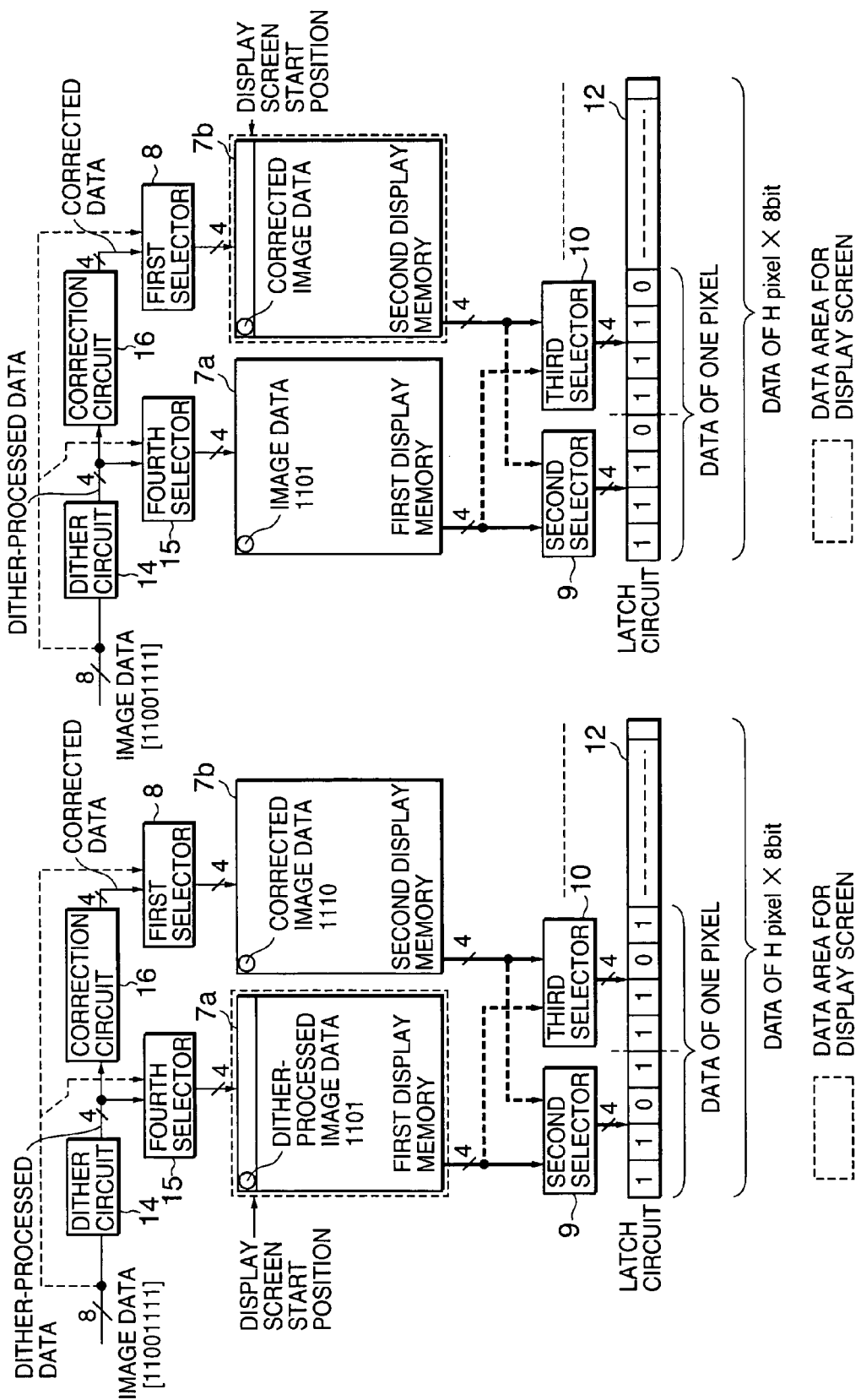

| MEMORY PARTITION SIGNAL (SELECT 1) | MEMORY READ SELECT SIGNAL (SELECT 2) | FIRST OUTPUT SELECTOR | SECOND OUTPUT SELECTOR | THIRD OUTPUT SELECTOR | FOURTH OUTPUT SELECTOR |
|---|---|---|---|---|---|
| OFF | OFF | LOW ORDER 4 BITS OF IMAGE DATA | — — | — — | HIGH ORDER 4 BITS OF IMAGE DATA |
| OFF | ON | LOW ORDER 4 BITS OF IMAGE DATA | DATA STORED IN FIRST DISPLAY MEMORY | DATA STORED IN SECOND DISPLAY MEMORY | HIGH ORDER 4 BITS OF IMAGE DATA |
| ON | OFF | CORRECTED IMAGE DATA (HIGH ORDER 4 BITS) | DATA STORED IN FIRST DISPLAY MEMORY | DATA STORED IN FIRST DISPLAY MEMORY | DITHER-PROCESSED IMAGE DATA (HIGH ORDER 4 BITS) |
| ON | ON | CORRECTED IMAGE DATA (HIGH ORDER 4 BITS) | DATA STORED IN SECOND DISPLAY MEMORY | DATA STORED IN SECOND DISPLAY MEMORY | DITHER-PROCESSED IMAGE DATA (HIGH ORDER 4 BITS) |

FIG. 19

CONTROLLER-DRIVER, DISPLAY DEVICE, AND DISPLAY METHOD

BACKGROUND OF THE INVENTION (1) Field of the Invention

The present invention relates to a controller-driver (represented by a controller-driver), a display device, and a display method for use in controlling a display screen on a mobile terminal apparatus or device, such as a cell phone, PDA (Personal Digital Assistant), and the like.

(2) Related Background Art

In recent years, with the trend toward high-performance and sophisticated portable terminals such as cell phones and PDAs, various types of information has been displayed on the screens. For example, prevalent types of cell phones are provided with an e-mail function, a Web browsing function, a photo-taking function, a movie display function, or the like in addition to a telephone communication function. Image data having a large data size is displayed on the screens of the cell phones as well as text data.

Referring to FIG. 33, the following describes a display device having a controller-driver with a built-in memory for use in a conventional cell phone or the like. The conventional display device comprises an image drawing unit 1 such as a CPU, a controller-driver 20 for receiving image data from the image drawing unit 1 and outputting it as display data, a display unit 3 in which pixels separated by data lines and gate lines are arranged in a matrix, a gradation voltage generating circuit 4 for generating a voltage for a gradation display, and a gate line drive circuit 5 for driving the gate lines of the display unit 3, the controller-driver 20 comprising a display memory 23 for storing image data, a latch circuit 24 for temporarily retaining a single line of image data, a data line drive circuit 25 for driving the data line of the display unit 3, a memory control circuit 21 for controlling read/write operations from or into the display memory according to a display memory control signal, and a timing control circuit 22 for controlling the memory control circuit 21, the latch circuit 24, and the gate line drive circuit 5 according to a timing control signal.

In the controller-driver 20 with the built-in memory having the above configuration, the display memory 23 generally has a storage capacity of one frame of image data. When the screen is not switched, the controller-driver stops an image data transfer from the image drawing unit 1 and outputs the image data stored in the display memory 23 to the display unit 3. When the screen is switched, the controller-driver sequentially stores the image data transmitted from the image drawing unit 1 into the display memory 23 and outputs it to the display unit 3 for displaying. In this connection, the portable terminal such as a cell phone has a limited size of the display unit 3 and a limited number of pixels from necessity of downsizing the entire device. Therefore, when an image file, e-mail, or the like exceeding the number of pixels of the display unit 3 is received, it is not possible to display all of the data on the display unit 3 and therefore the screen should be sequentially switched from one to another to display a whole of received information.

The screen switching display method, however, as described in Japanese Unexamined Patent Publication No. Hei 9-281950, has a problem that a user cannot understand the message immediately when a long message is transmitted by e-mail. Therefore, there is used a method in which message data is stored into the display memory as a bit map and a content of the display memory is shifted in such a way as to be correspondent to scrolling. When using the method of scrolling the display screen, high power consumption is needed if one frame of image data is stored into the display memory 23 whenever the screen is scrolled. Thereby, in the above publication, the power consumption is reduced by transferring only the image data of changed pixels from the image drawing unit 1.

Furthermore, there is a method in which a storage capacity of the display memory 23 is increased as a method of displaying an image file or e-mail exceeding the number of pixels of the display unit 3. For example, Japanese Unexamined Patent Publication No. Hei 7-295937 discloses a method of improving operationality of scrolling by storing display data in an area wider than an area of data that can be displayed on a display unit into a display memory, providing a mouse ball capable of detecting a scrolling distance and direction, and reading the scrolling information by means of an arithmetic operation unit.

When using the scroll function with the conventional controller-driver with the built-in memory as disclosed in Japanese Unexamined Patent Publication No. Hei 9-281950, however, the storage capacity of the built-in display memory is of one frame and therefore there is a need for transferring image data to be displayed anew from the CPU at every scrolling, thus causing a problem of increasing the power consumption. The increase of the power consumption is a significant problem for the portable terminal. The power supply need be large-sized to maintain the available time, thus damaging the feature of the small-sized and lightweight portable terminal.

In addition, the image data transfer from the image drawing unit 1 can be suppressed when using the scroll function by increasing the storage capacity of the display memory 23 built in the controller-driver 20. In the method, however, as disclosed in Japanese Unexamined Patent Publication No. Hei 7-295937, in which the display data in the area wider than the display area is stored in the image memory (display memory) and a display position on the image memory is shifted at scrolling, a chip area is increased by increasing the storage capacity of the display memory, thus obstructing the downsizing. Furthermore, an increase of a chip cost boosts up the device price problematically.

The present invention has been provided in view of the above problems. It is a main object of the present invention to provide a controller-driver, a display device, and a display method.

SUMMARY OF THE INVENTION

A controller-driver to which the present invention is applicable comprises a memory area which has a storage capacity for storing an amount of image data that is enough to display a single screen. Each image data is composed of a plurality of bits. The controller-driver according to the present invention further comprises a memory control circuit, which is selectively operable in a first mode and a second mode, for storing a whole of the image data of the plurality of bits into the memory area in the first mode and for storing a part of the image data of the plurality of bits into the memory area in the second mode to leave an empty area in the memory area.

In the above-mentioned controller-driver, the part of the image data formed by the plurality of bits is specified by a predetermined number of high order bits among the plurality of bits representative of the number of gradation levels.

The above-mentioned controller-driver is given, in the second mode, image data different from the above-referenced image data of the plurality of bits and desired high order bit or bits of the different image data are stored in the empty area of the memory area.

The above-mentioned controller-driver is given, in the second mode, image data of a plurality of bits subjected to bit-number conversion and color decrease process to a prescribed number of bits. The plurality of the bits subjected to the bit-number conversion and the color decrease process are used as a part of the image data formed by the plurality of bits.

The above-mentioned controller-driver is given, in the second mode, the image data of plurality of bits subjected to the bit-number conversion and color decrease process to the desired bits, in parallel with the image data of plurality of bits obtained by converting and color-decreasing the different image data into desired bits.

In the controller-driver, the different image data is specified by the image data that is next to a current screen in consecutive screens or that is obtained by carrying out predetermined processing in connection with the image data stored as a part of the image data formed by the plurality of bits.

The controller-driver comprises a color decrease process circuit the is operable in the second mode to execute bit-number conversion of input image data of the plurality of bits and the color decrease process into a prescribed number of bits to produce the prescribed number of bits as the part of the plurality of bits.

The color decrease circuit in the controller-driver is structured by a dither circuit for carrying out dither processing.

The controller-driver comprises a processing circuit operable in the second mode to carry out a predetermined process in connection with the input image data of the plurality of bits to produce processed image data as a part of the plurality of bits or to carry out the predetermined process in connection with the image data output from the color decrease circuit to produce as a part of the plurality of bits.

In the controller-driver, the processing circuit is operable in the second mode to carry out the predetermined processing in connection with the image data of a part of the plurality of bits stored in the memory area and a plurality of input bits or in connection with the image data output from the color decrease circuit and stores, into the empty area, processed image data as the part of the plurality of bits.

In the controller-driver, the memory area is divided into a plurality of subdivided memory areas that are equal to the bit number providing the gradation levels of the image data given by the plurality of bits. The first mode is for storing the whole of the image data by dividing the image data of the plurality of bits at every one of desired bit numbers in correspondence with a division factor of dividing the memory area. The second mode is for selecting either one of the divided memory areas to store a part of the image data formed by the plurality of bits.

In the controller-driver, the memory area is divided into a first divided memory area and a second divided memory area. The image data formed by the plurality of bits is equally divided into high and low order bits in relation to a plurality of bits concerned with the number of gradation levels. In the first mode, the high order bits of the divided image data are stored in the first divided memory area while the low order bits of the divided image data are stored in the second divided memory area. In the second mode, the high order bits of the image data formed by the plurality of bits are selectively stored in the first divided memory area or the second divided memory area as the part of the image data formed by the plurality of bits.

In the controller-driver, the memory area is divided into a plurality of divided memory areas equal in number to a bit number representative of the number of gradation levels. In the first mode, the image data of the plurality of bits is divided at every one bit into a plurality of subdivided memory areas with reference to plurality of bits representative of the number of gradation levels and the whole of the image data divided at every one bit is individually stored in each of the subdivided memory areas. In the second mode, the highest order bit representative of the number of the gradation levels is stored as the part of the plurality of bits in a selected one of the subdivided memory areas.

In the controller-driver, the memory control circuit is operable to control two display screens and the whole of the plurality of bits stored in the memory area is used to be displayed in the first mode on either one of the display screens while a part of the plurality of bits stored in the memory area is used in the second mode to be displayed on at least one of the display screens.

In the controller-driver, the memory control circuit is operable in the first mode to read out a whole of the image data stored in the subdivided memory areas and to be used as image data to be displayed. In the second mode, the memory control circuit reads out image data that is stored in either one of the subdivided memory areas and that is used as high order bits of the image data to be displayed. Low order bits of the image data to be displayed are formed by a selected one of the same data as the readout data, a part of the readout data, and predetermined data.

In the controller-driver, the second mode executes binary drive operation of putting a display screen into an on-state or an off-state in correspondence with the image data stored in the selected one of the subdivided memory areas.

The controller-driver comprises a first judgment circuit for controlling the first and the second modes by comparing the input image data of the plurality of bits with the memory capacity of the memory area.

The controller-driver further comprises a second judgment circuit for controlling the first and the second modes by judging whether or not the input image data of plurality of bits is to be subjected to predetermined processing.

The controller-driver is specified by controlling the first and the second modes on the basis of a mode selection signal given from an outside circuit.

The memory control circuit in the controller-driver controls a bit width of the part of the plurality of bits on the basis of a bit number selection signal in the second mode.

In the controller-driver, the memory area is specified by a memory of a memory capacity equivalent to a data amount of the image data for a single screen defined by H (pixels)×V (pixels)×n (bits).

From the above, it is readily understood that input image data is totally stored in the first mode while an empty area can be formed in the memory area in the second mode. The empty area can be used to store the plurality of the image data or used as a working area for predetermined processing. When the image data is stored in the empty area, a scroll function can be realized on the display screen, for example. In this event, when the scroll function is not used, the memory area is used to store the whole of the image data necessary for the single screen. The stored image data can be reproduced into and displayed as a single screen of a high gradation level. On the other hand, when the scroll function is used, a bit number representing the number of the gradation levels of the image data can be reduced. This makes it possible to store image data greater than the image data for the single scroll screen and to display the stored image data in a scroll manner. With this structure, a plurality of scroll images can be displayed without receiving the image data from the image rendering device at every one of the scroll operations.

As another example, the present invention is applicable to a mobile phone or a cell phone that has two kinds of display screens, such as a main display screen and a sub-display screen. In this case, both of data for the main display screen and data for the sub-display screen are stored in the memory area and are controlled so as to be switched from one to another. With this structure, it is possible to display two kinds of information on both the main display screen and the sub-display screen without increasing any controller-driver and an additional memory for the sub-display screen. Another example is to store, in the memory area, image data before and after a predetermined process and to switch both image data form one to another in use. For example, when a translucent or a semi-transparent display screen is used as the display screen, the memory area stores image data before and after a gamma ($\gamma$) characteristic is changed. With this structure, it is possible to change they characteristic with reference to presence or absence of back light. As an example of using the empty area as the working area, the empty area is used as an area for predetermined calculation in graphic processing.

A semiconductor integrated circuit according to the present invention is characterized in that the controller-driver is formed by a single chip.

Another semiconductor integrated circuit according to the present invention is characterized in that the controller-driver is mounted on a display panel which includes the display portion.

Thus, the controller-driver formed by the semiconductor integrated circuit may be structured by the single chip instead of a plurality of chips or may be integrated with the display portion.

According to another aspect of the present invention, a display device is characterized by the memory area that has the memory or storage capacity for storing the image data of the plurality of bits so as to sufficiently display the single screen and by the memory control circuit that is operable in the first mode to store the whole of the plurality of bits in the memory area and that is operable in the second mode to store a part of the plurality of bits in the memory area to leave the empty area in the memory area. According to the display device, the first mode is effective to store a whole of input image data in the memory area while the second mode is effective to leave the empty area in the memory area.

According to a further aspect of the present invention, a method is applicable to a display method in the controller-driver that has the memory area having the storage capacity for storing the image data of the plurality of bits so as to sufficiently display the single screen. Specifically, the display method is characterized by the memory control circuit that is operable to store the whole of the plurality of bits in the memory area in the first mode and that is operable to store the part of the plurality of bits in the memory area in the second mode and to leave the empty area in the memory area. Thus, the display method is specified by storing the whole of the input image data in the first mode and by leaving the empty area in the memory area in the second mode.

BRIEF DESCRIPTION OF THE DRAWINGS

FIGS. 4A and 4B are diagrams showing an image data flow (when the scroll function is used) in the controller-driver according to the first embodiment of the present invention;

FIG. 5 is a diagram showing selector outputs of the controller-driver according to the first embodiment of the present invention;

FIG. 9 is a diagram showing selector outputs of the controller-driver according to the second embodiment of the present invention;

FIGS. 18A and 18B are diagrams showing an image data flow (when the correction function is used) in the controller-driver according to the fourth embodiment of the present invention;

FIG. 19 is a diagram showing selector outputs of the controller-driver according to the fourth embodiment of the present invention;

DESCRIPTION OF THE PREFERRED EMBODIMENTS

In a controller-driver according to a preferred embodiment of the present invention, a display memory area (may be often called a display memory) that has a storage capacity of one frame (H pixels (H: pixels along the horizontal direction)×V pixels (V: pixel number along the vertical direction)×n bits (n: a bit number representative of the number of the gradation levels) is partitioned or divided with reference to a species of images into a plurality of memories (may be called divided or sub-divided memory areas). The display memory area stores the bit-divided image data (for example, high order bits and low order bits) into the partitioned display memories, and selects and reads out data by using selectors controlled by a memory control circuit. Thereby, it becomes possible to display high-level image data of one frame (synonymous with one screen) when a scroll function is not used and to display image data of the partition number of frames without accessing an image drawing unit when the scroll function is used, thereby reducing power consumption.

Furthermore, a part of the partitioned display memory is used as, for example, a memory area for storing corrected image data, a drawing memory area for using a graphic function, a memory area for storing overdrive data for performing overdrive processing for improving a speed of liquid crystal response, and a backside display memory area for a 2-screen display, thereby achieving various functions for use in portable terminals without adding a new display memory area.

EMBODIMENTS

The preferred embodiments of the present invention will now be described in more detail hereinafter with reference to the accompanying drawings.

First Embodiment

Figure 1:
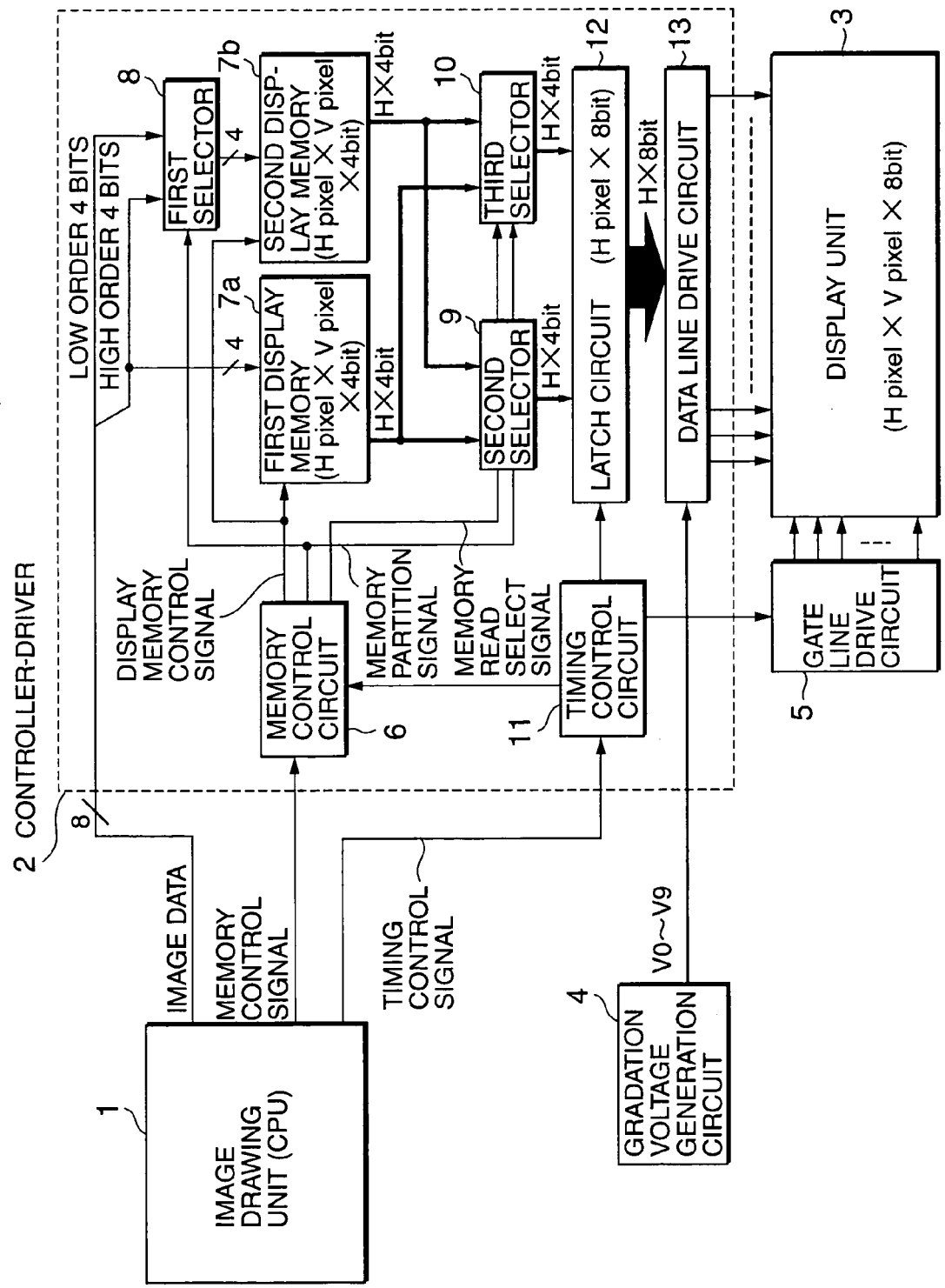
FIG. 1 is a diagram showing a configuration of a display device containing a controller-driver according to a first embodiment of the present invention.
Figure 2:
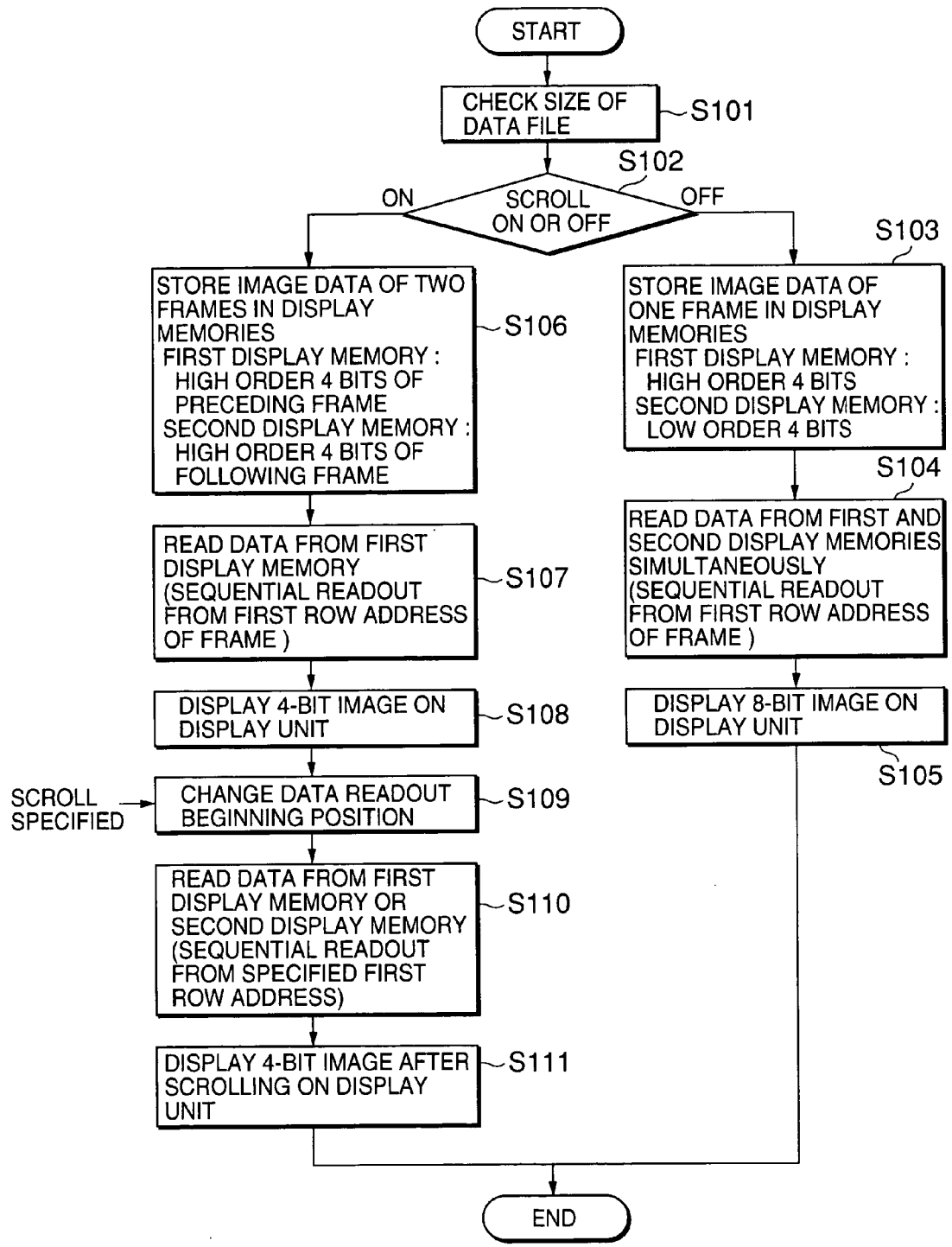
FIG. 2 is a flowchart showing an image data display procedure with the controller-driver according to the first embodiment of the present invention.
Figure 3:
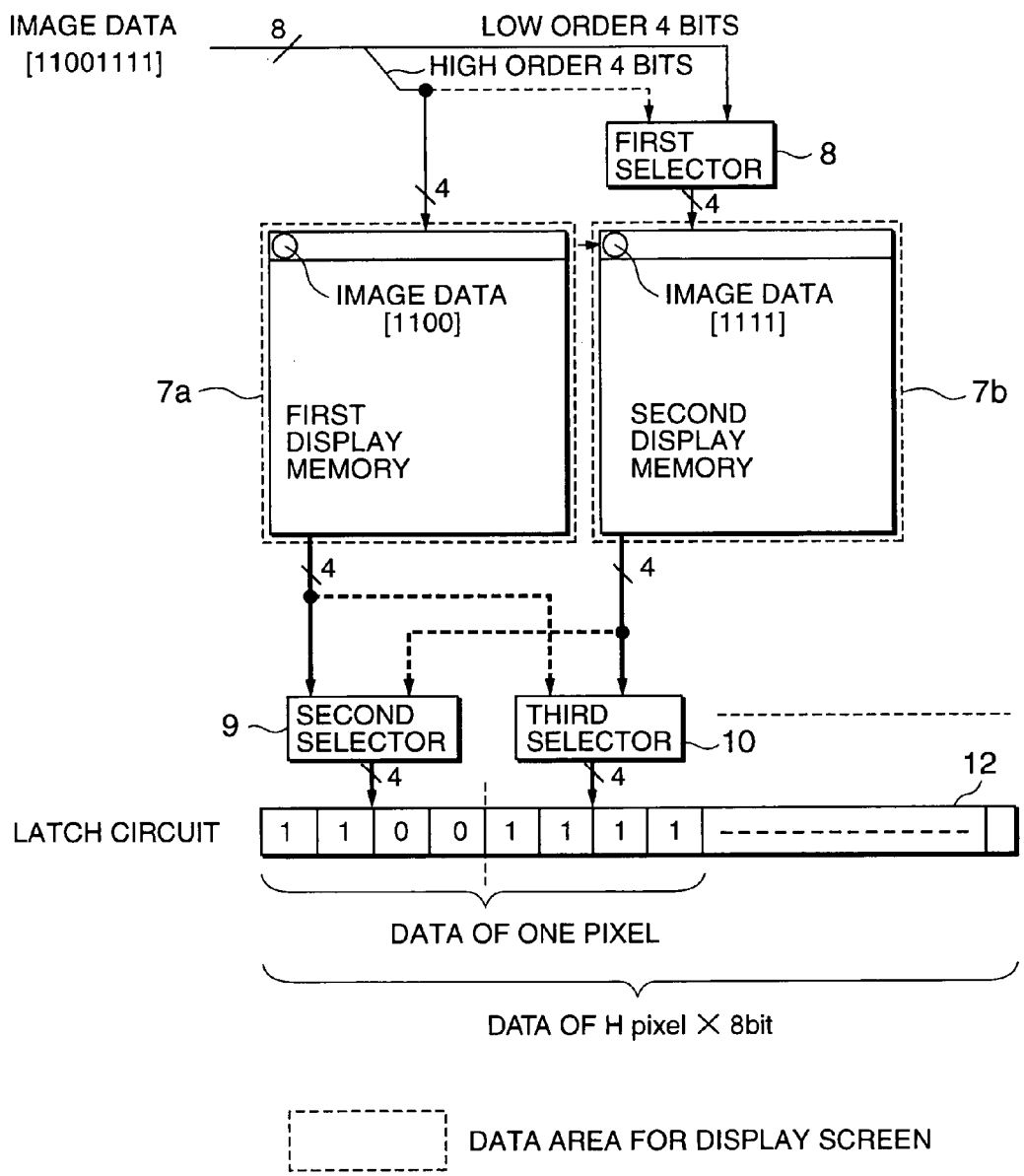
FIG. 3 is a diagram showing an image data flow (when a scroll function is not used) in the controller-driver according to the first embodiment of the present invention.

First, a controller-driver, a display device, and a display method according to a first embodiment of the present invention will now be described hereinafter by referring to FIG. 1 to FIG. 6. Referring to FIG. 1, there is shown a diagram of a configuration of a display device containing the controller-driver according to the first embodiment. Referring to FIG. 2, there is shown a flowchart of an image data display procedure with the controller-driver. Referring to FIG. 3 and FIG. 4, there are shown diagrams for explaining an image data flow for a case where a scroll function is used and an image data flow for a case where the scroll function is not used. Referring to FIG. 5, there is shown a diagram of selector states. In addition, referring to FIG. 6, there is shown a diagram of another configuration of the controller-driver according to this embodiment.

First, the following describes the configuration of the display device containing the controller-driver by referring to FIG. 1. While the display device described in this specification is applicable to an arbitrary display device, it is particularly preferable for use in a portable terminal such as a cellular phone or a PDA requiring downsizing and low power consumption. Although the configuration is described by giving an example of a case where 8-bit data is to be displayed, the number of bits of data is not limited to eight, but it is applicable similarly for 2-bit or longer data.

As shown in FIG. 1, the display device according to this embodiment comprises an image drawing unit 1 such as a CPU, a controller-driver 2 for receiving 8-bit image data from the image drawing unit 1 and outputting it as display data, a display unit 3 where pixels separated by data lines and gate lines are arranged in a matrix, a gradation voltage generating circuit 4 for generating a voltage for an 8-bit gradation display, and a gate line drive circuit 5 for driving the gate line of the display unit 3, the controller-driver 2 comprising two display memories (a first display memory 7a and a second display memory 7b) for storing the image data, three selectors (a first selector 8, a second selector 9, and a third selector 10) for selecting input-output data in the display memories, a memory control circuit 6 for controlling the display memories with a display memory control signal and controlling the selectors with a memory partition signal and a memory read select signal, a latch circuit 12 for retaining a single line of image data selected by the second selector 9 and the third selector 10, a timing control circuit 11 for controlling the memory control circuit 6, the latch circuit 12, and the gate line drive circuit 5 with a timing control signal, and a data line drive circuit 13 for driving the data line of the display unit 3 at a gradation voltage according to the image data from the latch circuit 12. While the display memory is divided in order to simplify the description in the diagram, the display memory need not always be physically divided. Only required is that the storage area is partitioned so that each area is controllable independently.

Figure 33:
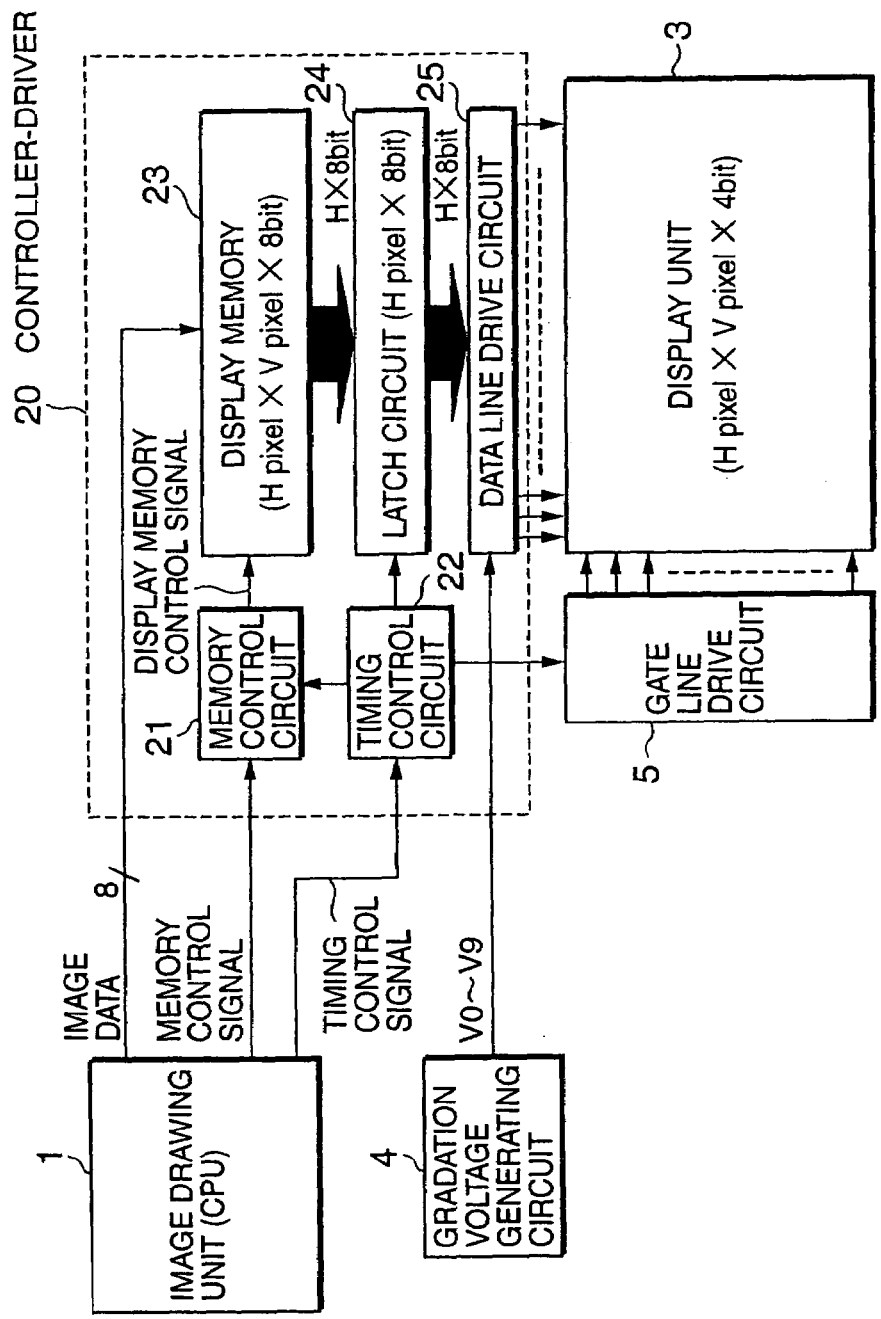
FIG. 33 is a diagram showing a configuration of a conventional controller-driver.

In this connection, in the configuration of the conventional controller-driver 20 shown in FIG. 33, the display memory 23 having a storage capacity of one frame (H pixels×V pixels×8 bits) consists of a single block and 8-bit image data is rewritten in units of a pixel according to a display memory control signal of the memory control circuit 21. In the controller-driver 2 of this embodiment, however, the display memory is partitioned into the first display memory 7a and the second display memory 7b each having a storage capacity of H pixels×V pixels×4 bits in size, and bit-divided (in the following description, the high order 4 bits and the low order 4 bits) image data is stored at an address specified by the display memory control signal in each of the display memories. The display memory control signal includes a read signal enabling a readout operation from the display memory, a write signal enabling a write operation into the display memory, and a display screen start position address signal. These signals are used to control the first display memory 7a and the second display memory 7b individually.

Specifically, the first display memory 7a stores high order 4 bits of image data transmitted from the image drawing (rendering) unit (formed by CPU)1, and the second display memory 7b stores low order 4 (four) bits of the current frame or high order 4 (four) bits of the next frame selected by the first selector 8 controlled according to the memory partition signal. It is to be noted that the subsequent or next frame carries image data different from the current frame.

Furthermore, the second selector 9 controlled according to the memory read select signal selects high order 4 bits stored in the latch circuit 12 from the first display memory 7a or the second display memory 7b, and the third selector 10 selects low order 4 bits stored in the latch circuit 12 from the first display memory 7a or the second display memory 7b. While the image data is processed in units of a pixel in the following description, it is also possible to process the image data collectively by providing selectors for a single line.

The following describes an operation of displaying an image on the image drawing unit 1 and the controller-driver 2 of this embodiment by referring to FIG. 2 to FIG. 4. First, in step S101, the image drawing unit 1 checks a size of a received image data file. In step S102, it is determined whether the image data has a size that can be displayed in one frame. If the data can be displayed in one frame, it is determined that the scroll function is not used and a process of step S103 is performed. If a plurality of frames (two frames in this embodiment) are needed, it is determined that the scroll function is used and a process of step S106 is performed.

When the scroll function is not used, as shown in FIG. 3, the low order 4 bits of the image data are selected by the first selector 8 controlled according to the memory partition signal. Thereby, the first display memory 7a stores the high order 4 bits ("1100" in FIG. 3) of the image data of one frame and the second display memory 7b stores the low order 4 bits (the low order 4 bits of the image data stored in the first display memory 7a: "1111" in FIG. 3) of the image data of one frame (step S103).

Furthermore, the second selector 9 controlled according to the memory read select signal selects the image data stored in the first display memory 7a and the third selector 10 selects the image data stored in the second display memory 7b (indicated by solid lines in FIG. 3). Thereafter, the high order 4 bits of the above image data read from the first display memory and the low order 4 bits of the above image data read from the second display memory 7b are transferred to high order 4 bits and low order 4 bits in the latch circuit 12, respectively. Thus, the same data as the original image data "11001111" is restored in the latch circuit 12 (step S104). The data is written into the first display memory 7a and the second display memory 7b simultaneously and read from the first display memory 7a and the second display memory 7b simultaneously. The start position on each display screen is the first row address of the first display memory 7a or the second display memory 7b (areas enclosed by thin lines at the top of the memory areas in FIG. 3).

Thereafter, in response to the timing control signal from the timing control circuit 11, the latch circuit 12 retains one line of data and transmits it to the data line drive circuit 13, the data line drive circuit 13 controls a data line of the display unit 3 with the gradation voltage generated by using a voltage from the gradation voltage generating circuit 4, and the display unit 3 displays an 8-bit image (step S105).

On the other hand, when the scroll function is used, as shown in FIG. 4, the first selector 8 controlled according to the memory partition signal selects the high order 4 bits of the image data of the next frame instead of the low order 4 bits of the image data of the current frame. Thereby, the first display memory 7a stores the high order 4 bits of the image data in the first frame of the two frames and the second display memory 7b stores the high order 4 bits of the image data in the next frame of the two frames (step S106).

If the image data displayed by the display unit 3 exists in the first display memory 7a, the second selector 9 and the third selector 10 controlled according to the memory read select signal select corresponding image data stored in the first display memory 7a, respectively. The respective data are transferred to the high order 4 bits and the low order 4 bits of the latch circuit 12 (step S107). Thereby, the display unit 3 displays a 4-bit image (although the same data as the high order 4 bits is written at the low order 4 bits for a reason described later, the low order 4 bits are different from those of the actual image data and therefore represented as a 4-bit image) (step S108).

Subsequently, upon receiving a scroll instruction from a scroll unit, which is not shown, a data readout beginning position is changed in step S109. In the operation, the image data displayed by the display unit 3 includes the next frame stored in the second display memory 7b. Therefore, if the data stored in the first display memory 7a is displayed first, as shown in FIG. 4(a), the second selector 9 and the third selector 10 select data in the first display memory 7a in the same manner as for the above and transfer the data to high order 4 bits and low order 4 bits of the latch circuit 12. If the image data stored in the second display memory 7b is displayed subsequently, as shown in FIG. 4(b), the second selector 9 and the third selector 10 select data in the second display memory 7b and transfer the data to the high order 4 bits and the low order 4 bits of the latch circuit 12 (step S110). Thereby, the display unit 3 displays a 4-bit image after the scroll (although the same image data as the high order 4 bits is transferred to the low order 4 bits here, too, the low order 4 bits are different from those of the actual image data and therefore represented as a 4-bit image)(step S111).

The write operations into the first display memory 7a and the second display memory 7b are performed separately and the read operations from the first display memory 7a and the second display memory 7b are performed separately, too, where the start position on the display screen is controlled according to the display screen start position address signal. Therefore the display memories store two frames of image data. Thus, even if the scroll function is used, only the start position on the display screen changes and it is possible to display an image by using data stored in the first and second display memories 7a and 7b unless the image data changes. Therefore, a transfer of the image data from the image drawing unit 1 can be halted, thereby reducing the power consumption.

Referring to FIG. 5, there is shown a table of a relation between control signals (the memory partition signal and the memory read select signal) and data output from the selectors. The memory partition signal is a control signal for the first selector 8 sent from the memory control circuit 6. The first selector 8 selects the low order 4 bits of the image data in the off state, while it selects the high order 4 bits of the next frame in the on state. The memory read select signal is a control signal for the second selector 9 and the third selector 10 sent from the memory control circuit 6. The selectors select image data in the first display memory 7a or the second display memory 7b according to a combination with the memory partition signal.

FIG. 3 shows a condition where the memory partition signal is off and the memory read select signal is on. Under the condition, the low order 4 bits of the image data are input to the second display memory 7b, and the high order 4 bits of the first display memory 7a and the low order 4 bits of the second display memory 7b are transferred to the latch circuit 12 from the second selector 9 and the third selector 10, respectively. FIG. 4(a) shows a condition where the memory partition signal is on and the memory read select signal is off. Under the condition, the high order 4 bits of the next frame are input to the second display memory 7b, and the high order 4 bits of the first display memory 7a are transferred from the second selector 9 and the third selector 10 to the latch circuit 12. FIG. 4(b) shows a condition where the memory partition signal is on and the memory read select signal is on. Under the condition, the high order 4 bits of the next frame of the second display memory 7b are transferred from the second selector 9 and the third selector 10 to the latch circuit 12.

To display a 4-bit image here, a fixed value such as "0000" or "1111" can be given to the low order 4 bits. For example, however, if "0000" is added to the low order 4 bits, a possible value of the image data ranges from "00000000" to "11110000," and if "1111" is added to the low order 4 bits, a possible value ranges from "00001111" to "11111111." Therefore, it is impossible to have data of all bits set to one in the former and of all bits set to zero in the latter, by which complete white nor black cannot be displayed. Therefore, in this embodiment, the same value as the high order 4 bits is given to the low order 4 bits also for a 4-bit display as shown in FIG. 4 so as to achieve a display of "00000000" to "11111111," thereby enabling a complete black-and-white display also when only the high order 4 bits are used.

Figure 6:
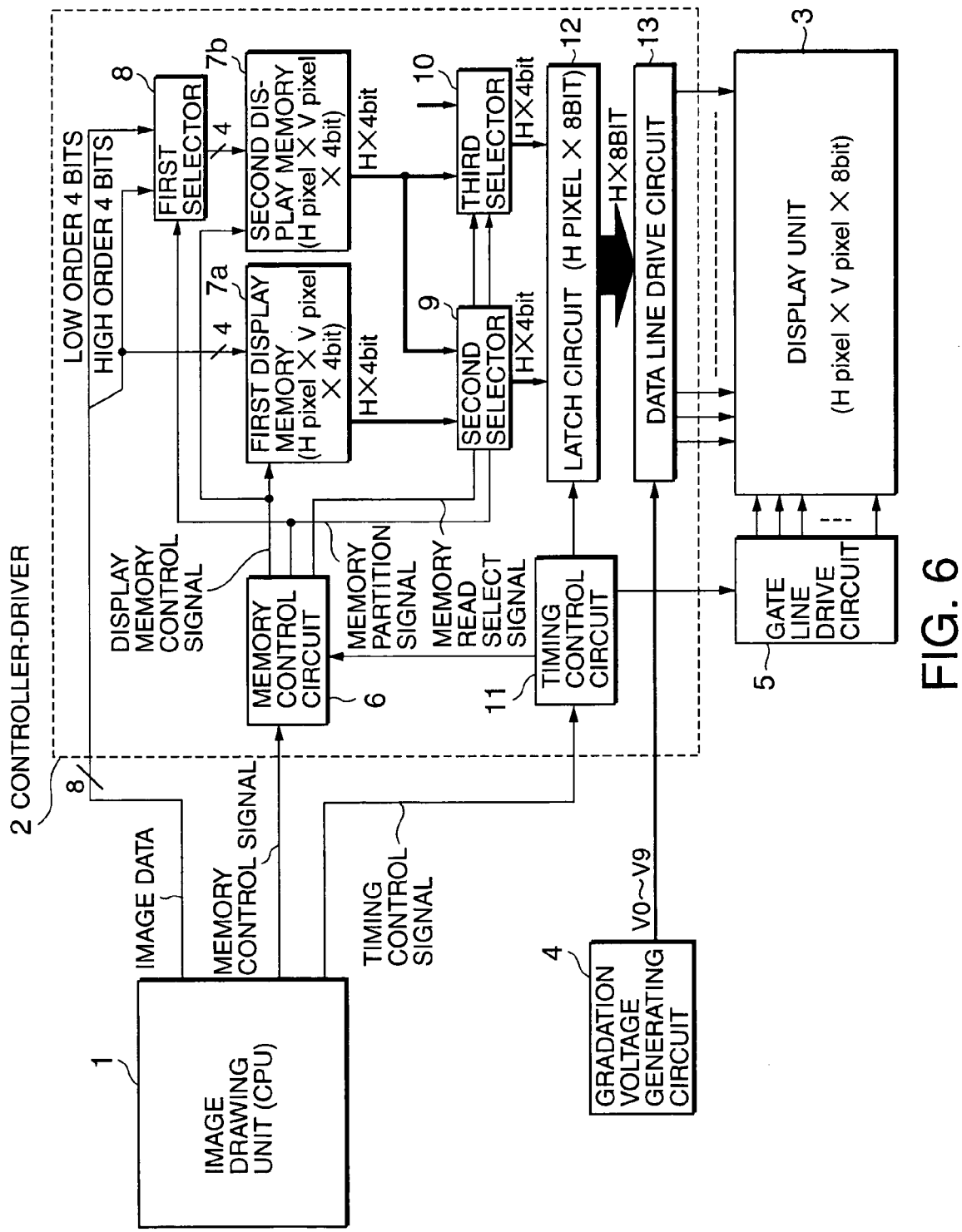
FIG. 6 is a diagram showing another configuration of the controller-driver according to the first embodiment of the present invention.

If a fixed value is given to the low order 4 bits by using only a 4-bit display, there can be an arrangement in which the second selector 9 selects the first display memory 7a or the second display memory 7b and the third selector 10 selects the second display memory 7b or a predetermined fixed value as shown in FIG. 6.

As set forth hereinabove, a display memory having a storage capacity of one frame of image data is partitioned, where one display memory stores the high order 4 bits of the image data and the other display memory stores the low order 4 bits when the scroll function is not used or the high order 4 bits of the next frame when the scroll function is used by using the first selector 8, and the second selector 9 and the third selector 10 select data read from the partitioned display memories and the data is transmitted to the latch circuit 12, by which the scroll function can be used without adding more display memory nor increasing power consumption and high-level original image data can be displayed due to image data not requiring scrolling.

In addition, in the 4-bit display, a fixed value is not added to the low order 4 bits, but the same value as the high order 4 bits is added, by which a possible range of the image data is expanded and therefore a complete black-and-white display is achieved, thus preventing a degradation of the display quality.

Second Embodiment

Figure 7:
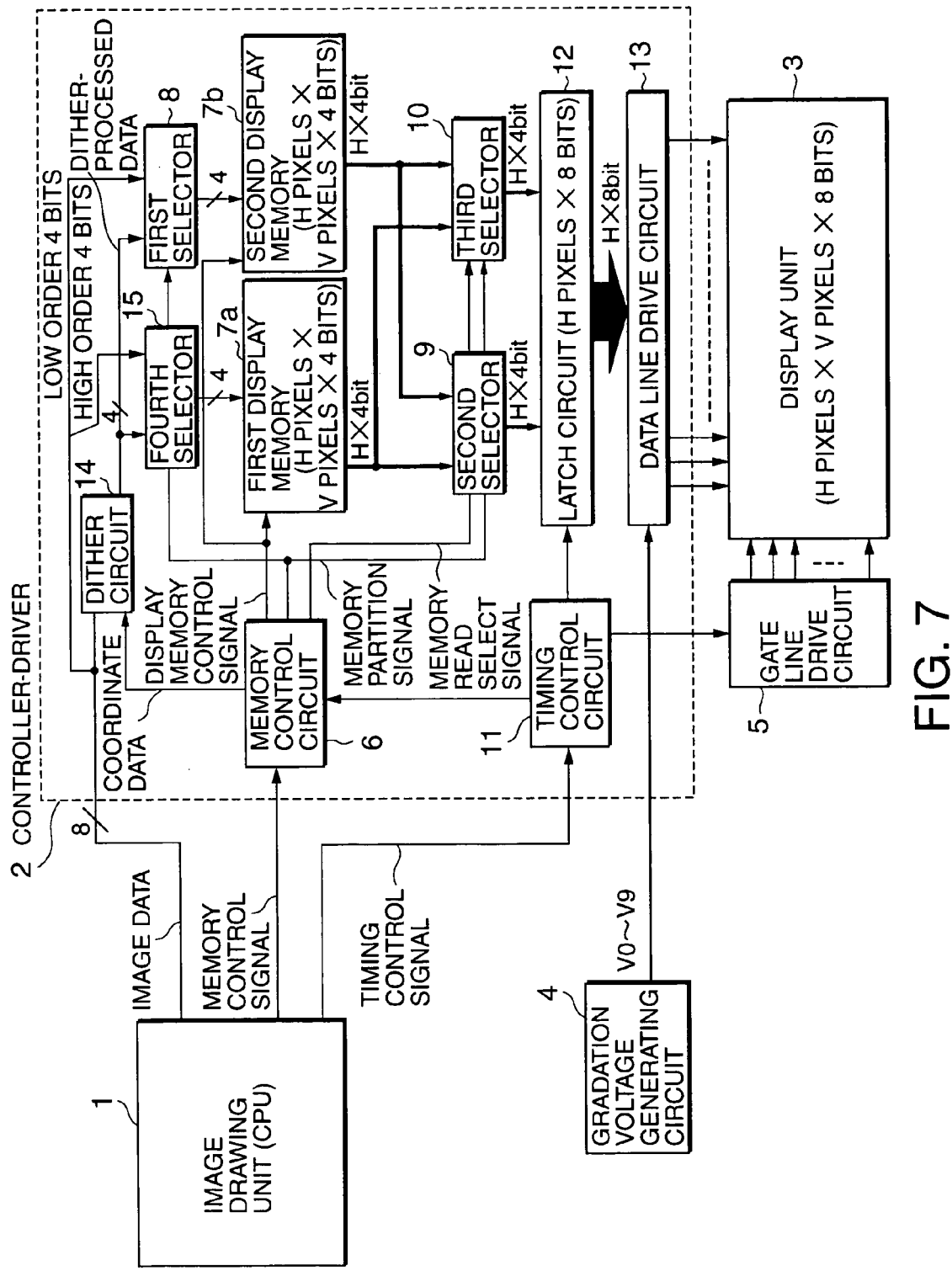
FIG. 7 is a diagram showing a configuration of a display device containing a controller-driver according to a second embodiment of the present invention.
Figure 8:
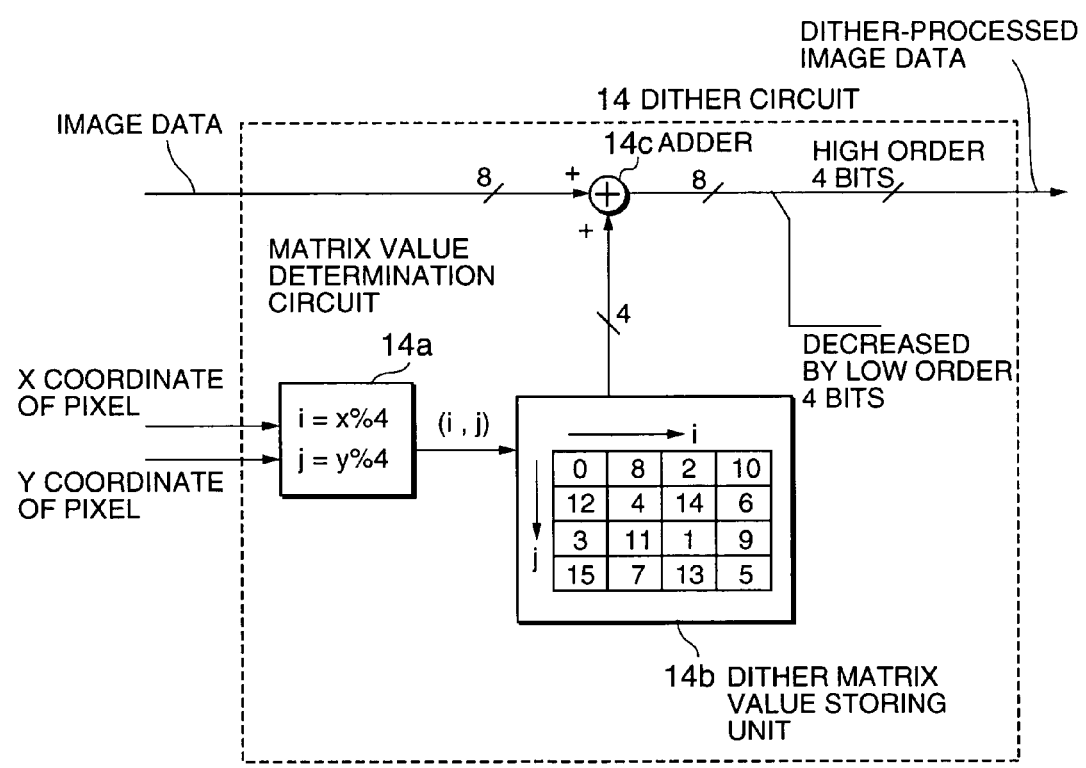
FIG. 8 is a diagram showing a configuration of a dither circuit.
Figure 10:
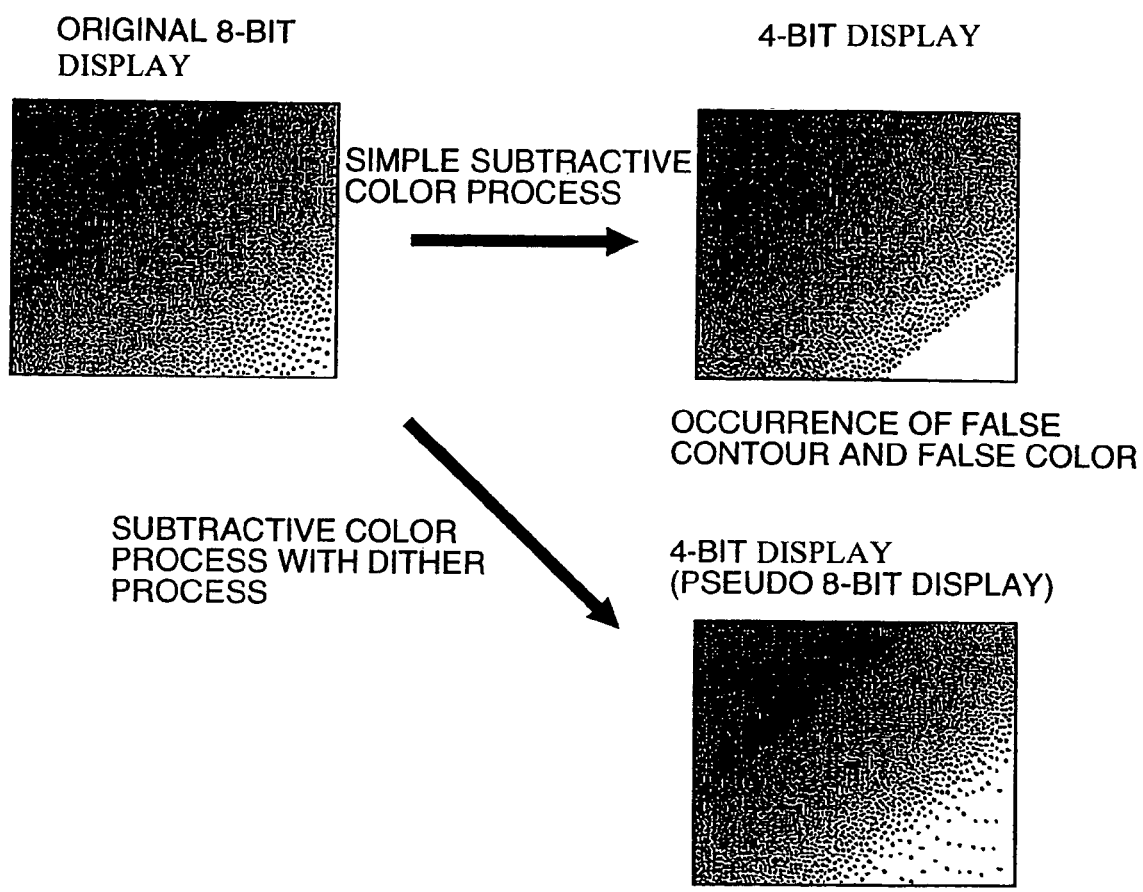
FIG. 10 is a diagram for assistance in explaining an effect of the controller-driver according to the second embodiment of the present invention.

The following describes a controller-driver, a method of driving the controller-driver, and a method of processing image data according to a second embodiment of the present invention by referring to FIG. 7 to FIG. 11. Referring to FIG. 7, there is shown a diagram of a configuration of a display device containing the controller-driver according to the second embodiment. Referring to FIG. 8, there is shown a diagram of a configuration of a dither circuit. Referring to FIG. 9, there is shown a diagram of selector states. Referring to FIG. 10, there is shown a diagram for assistance in explaining an effect of this embodiment. Furthermore, referring to FIG. 11, there is shown a diagram of a configuration of another controller-driver according to this embodiment.

As shown in FIG. 7, the controller-driver 2 of this embodiment further comprises a dither circuit 14 and a fourth selector 15 in an input stage for the image data of the display memory in addition to the configuration of the first embodiment shown in FIG. 1. Thus, when a scroll function is used, dither process (pseudo level representation) is made on image data stored in the display memory to prevent an occurrence of a false contour and a false color which may be caused by a truncation of low order bits.

The dither process is a technique for performing a pseudo gradation display of the original image data when the number of image bit planes is reduced. FIG. 8 shows a configuration of the dither circuit 14. The dither circuit 14 comprises a matrix value determination unit 14a, a dither matrix value storing unit 14b, and an adder 14c. The dither circuit 14 receives an input of 8-bit original image data and coordinate data (x coordinate, y coordinate) of an input image. The adder 14c adds a dither matrix value, which is determined uniquely from the coordinate data, to the image data and the value is quantized (image data whose low order 4 bits are deleted is output here). The execution of the dither process prevents a false contour and a false color caused by decreasing the number of image bit planes when a value of the image data changes gradually. Note that, however, the adder 14c should be controlled so as not to cause an image data overflow in the dither process, though it is omitted in FIG. 8.

In this embodiment, for the execution of the dither process, the fourth selector 15 is provided in an input stage of a first display memory 7a. Then, high order 4 bits of the image data or dither-processed high order 4 bits are input to the fourth selector 15 and low order 4 bits of the image data or dither-processed high order 4 bits of the next frame are input to a first selector 8. Thereby, the dither-processed data is stored in the first display memory 7a and a second display memory 7b when the scroll function is used. Herein, it is noted that the next frame image data stored in the second display memory 7b is different from the current frame image data stored in the first display memory 7a.

Referring to FIG. 9, there is shown a diagram of relations between control signals and respective data output from the selectors. A condition where the scroll function is not used corresponds to the memory partition signal in the off state and the memory read select signal in the on state. Under the condition, the high order 4 bits are input to the first display memory 7a by the fourth selector 15, the low order 4 bits are input to the second display memory 7b by the first selector 8, the high order 4 bits of the first display memory 7a are transmitted from the second selector 9 to the latch circuit 12, and the low order 4 bits of the second display memory 7b are transmitted from the third selector 10 to the latch circuit 12, by which the original 8-bit image data is displayed.

A condition where the scroll function is used and a previous frame is displayed corresponds to the memory partition signal in the on state and the memory read select signal in the off state. Under the condition, dither-processed high order 4 bits are input to the first display memory 7a by the fourth selector 15, dither-processed high order 4 bits of the next frame are input to the second display memory 7b by the first selector 8, dither-processed high order 4 bits in the first display memory 7a are transmitted from the second selector 9 and the third selector 10. A condition where the next frame is displayed corresponds to the memory partition signal in the on state and the memory read select signal in the on state. Under the condition, the second selector 9 and the third selector 10 transmit the dither-processed high order 4 bits in the second display memory 7b and a dither-processed pseudo 8-bit image is displayed.

Referring to FIG. 10, there is shown a diagram of a comparison of an 8-bit display image, a 4-bit display image (the display screen in the first embodiment: when the scroll function is used), and a pseudo 8-bit display image (the display screen of this embodiment: the scroll function is used). As apparent from FIG. 10, the same value as the high order 4 bits is given to the low order 4 bits of the image data when the scroll function is used in the configuration of the first embodiment and therefore the image data has the same value in an area where the tone level is gradually changing (only the low order 4 bits are gradually changing), thereby causing false contours to be generated. On the other hand, in this embodiment, the execution of the dither process prevents the occurrence of the false contours as shown.

Figure 11:
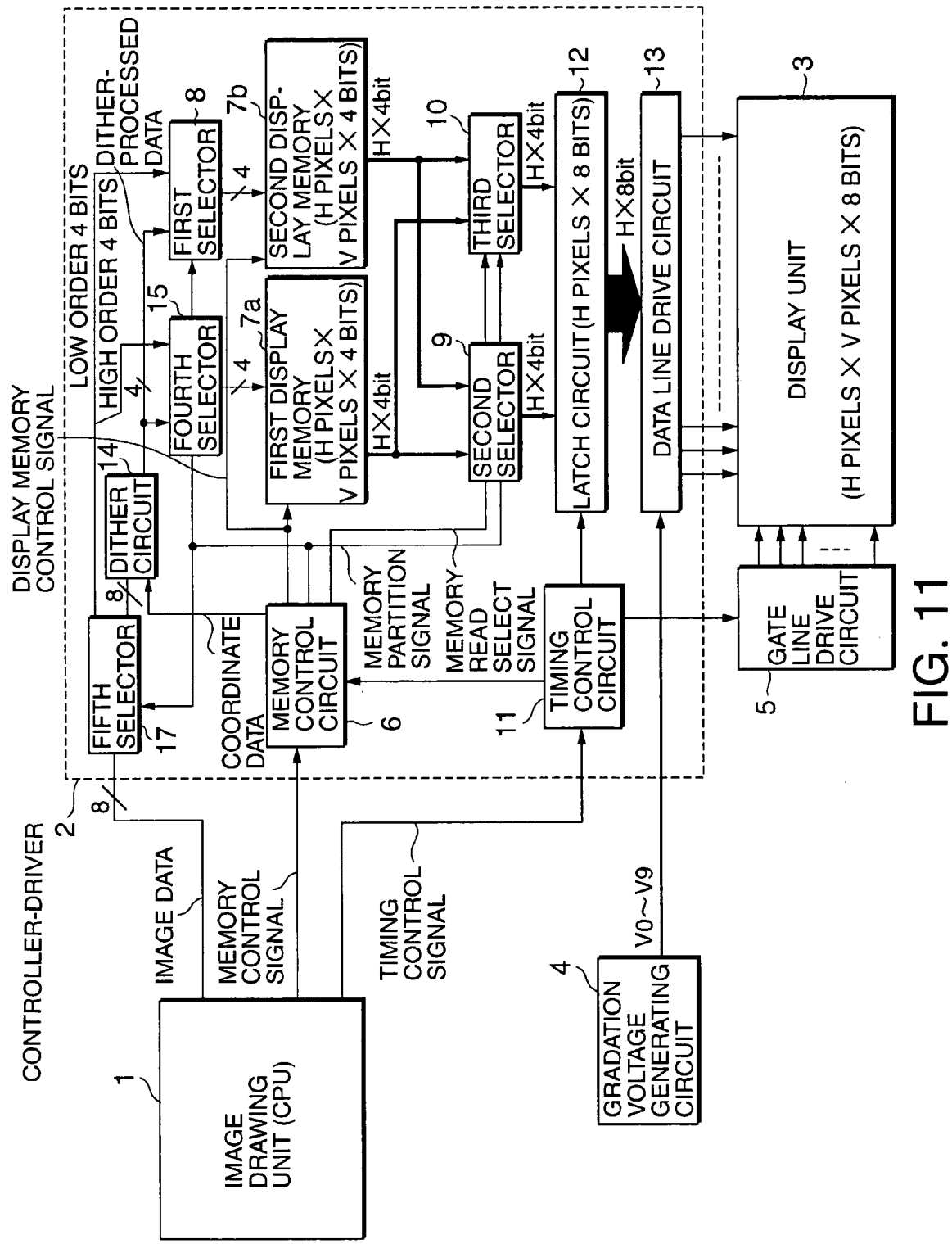
FIG. 11 is a diagram showing another configuration of the display device containing the controller-driver according to the second embodiment of the present invention.

Although the dither circuit 14 is always running when the dither-processed image data is input to the first selector 8 and the fourth selector 15 in the above configuration, it is also possible to use another configuration for reducing power consumption, where a fifth selector 17 is provided in a previous stage of the dither circuit 14 as shown in FIG. 11, the fifth selector 17 is controlled according to the memory partition signal of the memory control circuit 6, and an operation of the dither circuit 14 is halted when the scroll function is not used.

Third Embodiment

Figure 12:
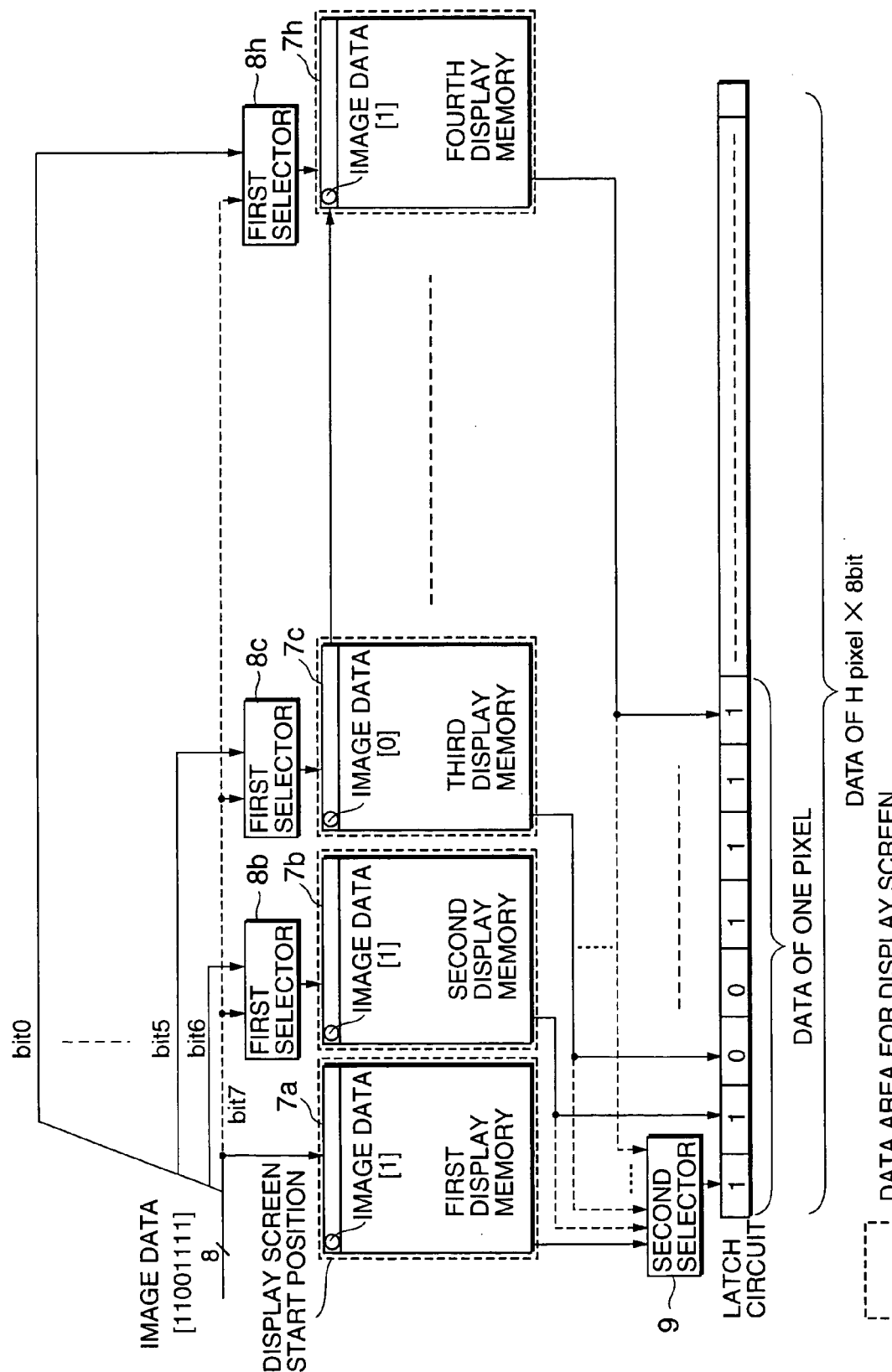
FIG. 12 is a diagram showing an image data flow (when the scroll function is not used) in a controller-driver according to a third embodiment of the present invention.
Figure 13:
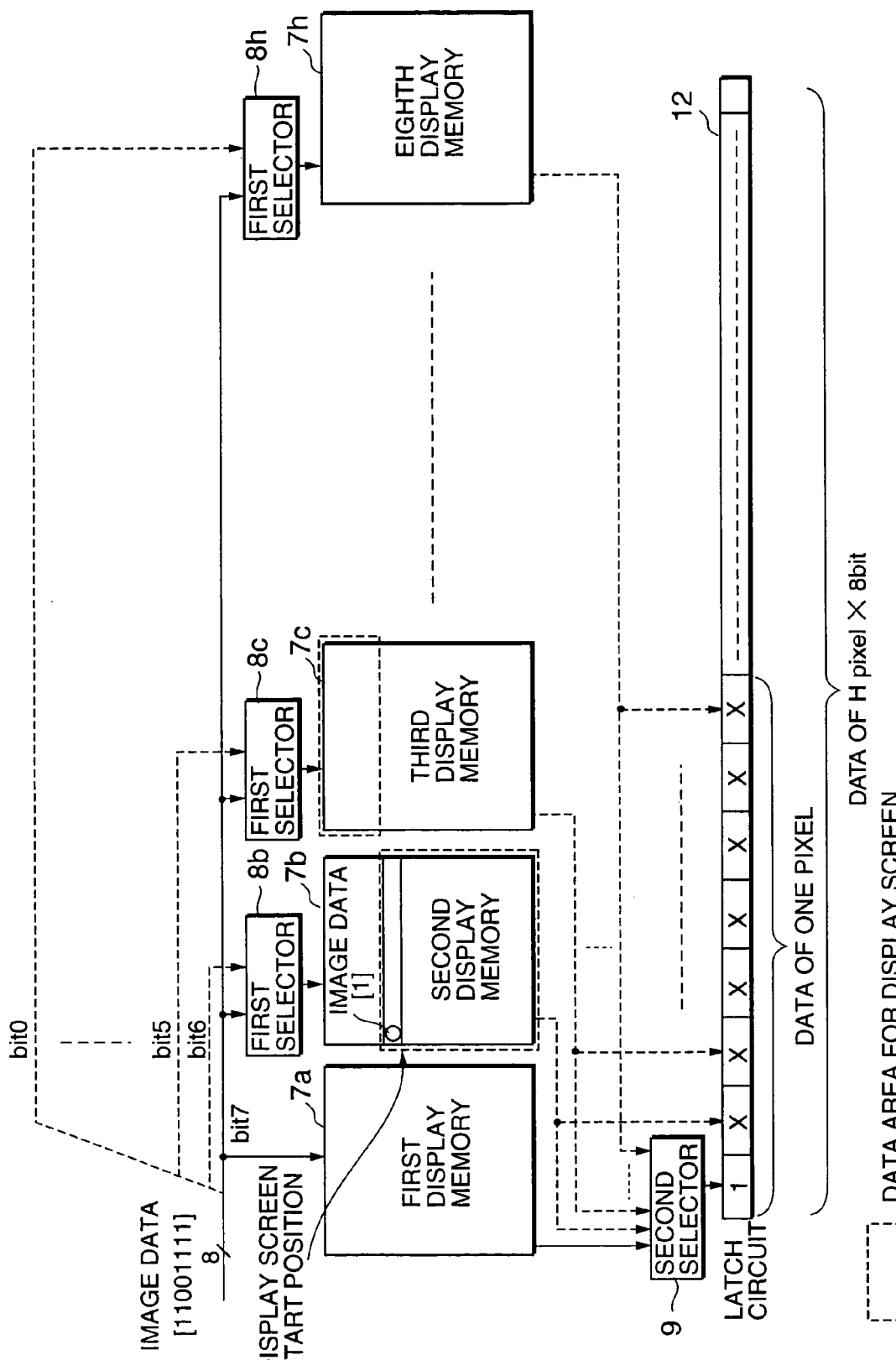
FIG. 13 is a diagram showing an image data flow (the scroll function is used) in the controller-driver according to the third embodiment of the present invention.
Figure 14:
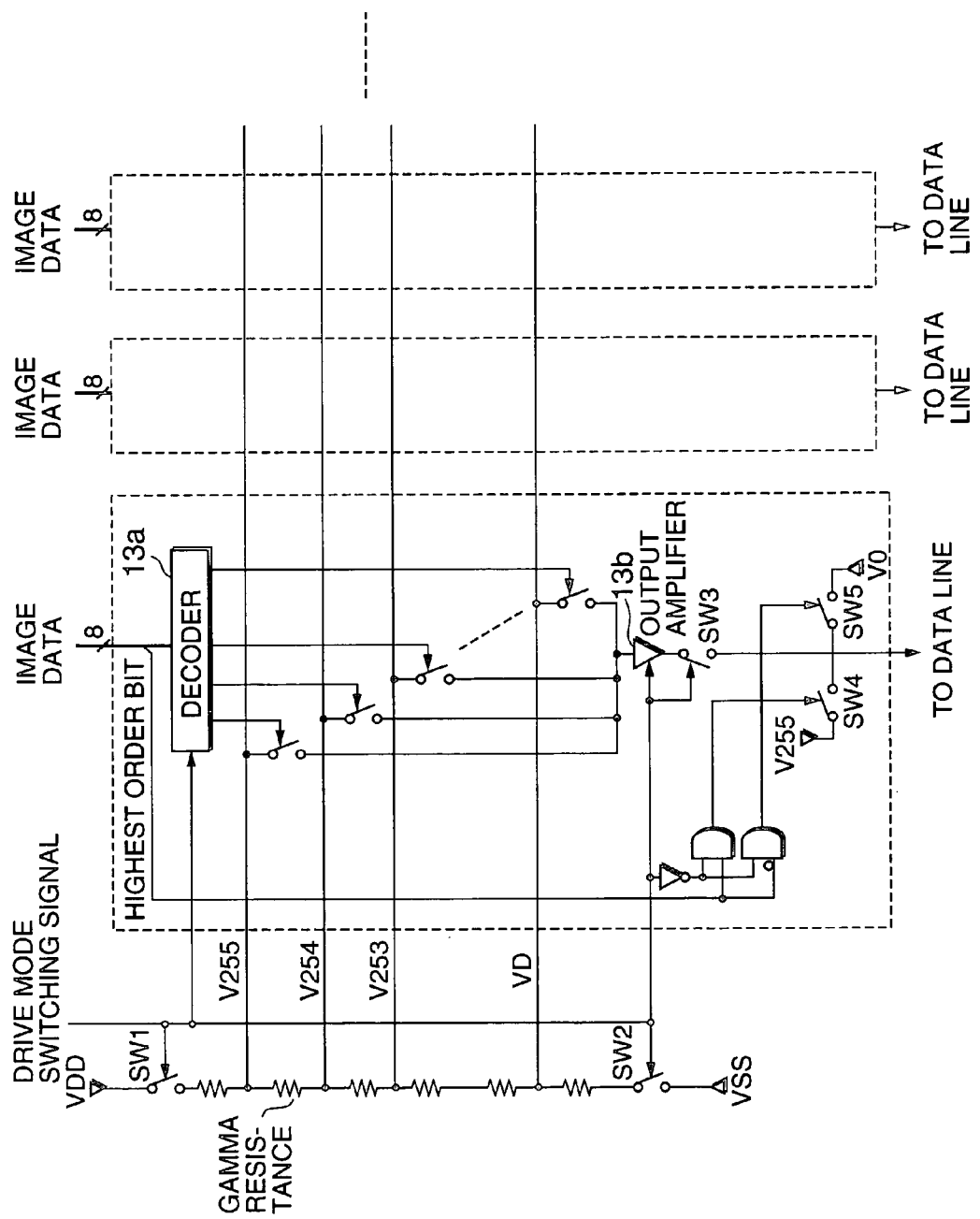
FIG. 14 is a diagram showing a configuration of a data line drive circuit according to the third embodiment of the present invention.
Figure 15:
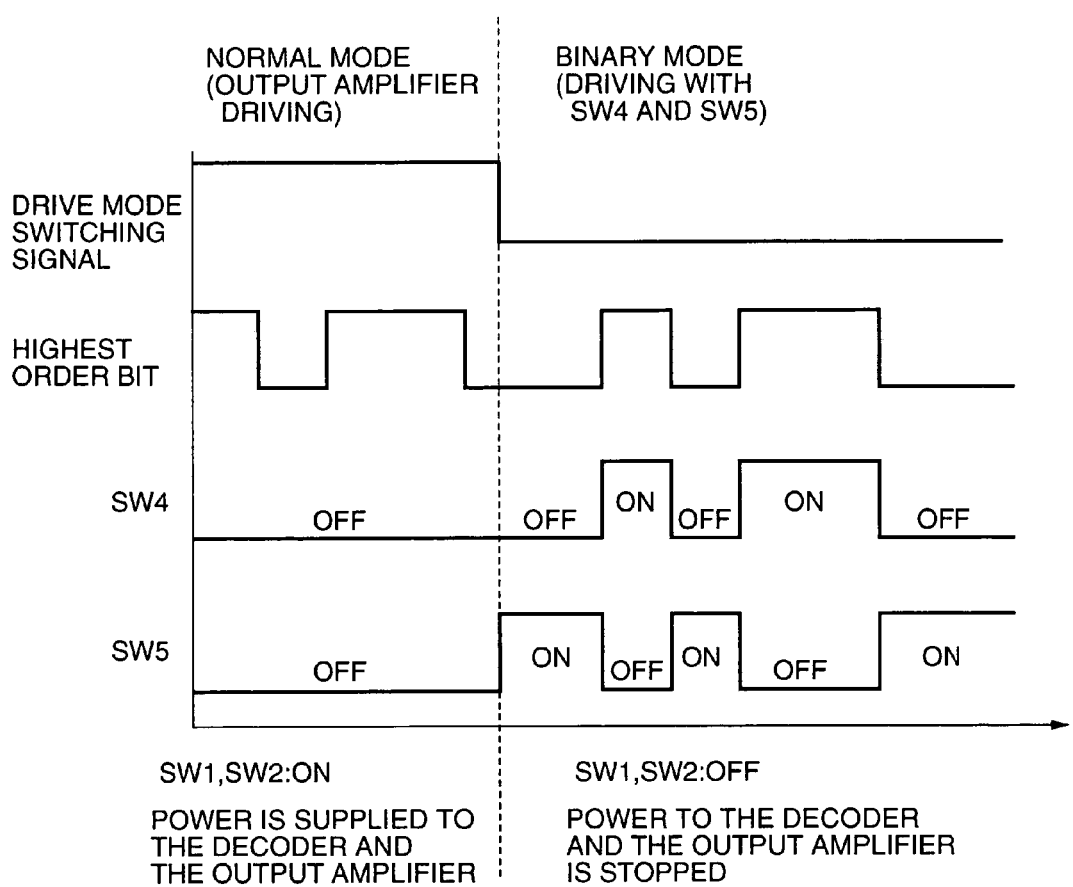
FIG. 15 is a timing chart showing timings of switches for the data line drive circuit according to the third embodiment of the present invention.

The following describes a controller-driver, a display device, and a display method according to a third embodiment of the present invention by referring to FIG. 12 to FIG. 15. Referring to FIG. 12 and FIG. 13, there are shown image data flows for cases where a scroll function is used and not used in the controller-driver according to the third embodiment. Referring to FIG. 14, there is shown a diagram of configuration of an output unit in a data line drive circuit. Referring to FIG. 15, there is shown a timing chart of switch operations.

While the first and second embodiments have been described by giving an example of partitioning the display memory into two memories, the number of partitioned display memories is not limited to two, but can be set to an arbitrary value up to the number of bits of the image data. For example, it is possible to provide a display memory for each bit as shown in FIG. 12 and FIG. 13. In this condition, assuming 8-bit image data, the display memory is partitioned into eight memories, namely, the first to eighth display memories 7a to 7h, and first selectors 8b to 8h are provided in input stages of the second to eighth display memories 7b to 7h. In addition, a single second selector 9 is provided between the first to eighth display memories 7a to 7h and the latch circuit 12.

When the scroll function is not used in the controller-driver 2 having the above configuration, the image data flows as indicated by a solid line in FIG. 12 for each bit. The first selectors 8b to 8h controlled according to the memory partition signal cause the image data ("11001111" in FIG. 12) transmitted from the image drawing unit 1 to be stored into the first to eighth display memories 7a to 7h from the high order bits in order. Thereafter, the second selector 9 controlled according to the memory read select signal selects the first display memory 7a. Data in the first display memory 7a is then written at the highest order bit of the latch circuit 12 and corresponding data in the second to eighth display memories 7b to 7h are written at the low order bits, by which the original 8-bit image data is restored.

When the scroll function is used, the image data flows as indicated by the solid line in FIG. 13 for each bit. The first selectors 8b to 8h controlled according to the memory partition signal cause the highest order bit of the first frame to be stored into the first display memory 7a and cause the highest order bit of each image data in the second to eighth frames to be stored into the second to eighth display memories 7b to 7h. Thereafter, the second selector 9 controlled according to the memory read select signal selects the first to eighth display memories 7a to 7h sequentially (FIG. 13 shows a condition where the second frame is displayed and the second selector 9 selects the second display memory 7b). The second through the eighth frames carry the image data different from the first frame.

One of the data in the first to eighth display memories 7a to 7h is written at the highest order bit in the latch circuit 12, thereby displaying binary data of the corresponding frame.

With this arrangement, e-mail or other binary information (a black-and-white image) can be stored in a display memory for eight screens. Thereby, even if long e-mail is received, it can be displayed with only data stored in the display memory when the scroll function is used and the data transfer from the image drawing unit 1 is halted, thereby reducing the power consumption.

When the scroll function is used, it is also possible to drive the data line drive circuit 13 in a binary fashion, focusing on the highest order bit stored in the latch circuit 12. More specifically, though there is a need for amplifying a signal with an amplifier in the data line drive circuit 13 if data is displayed with a plurality of bits, the data line drive circuit 13 can be driven by an on-off control with a switch if it is driven with a single bit.

For example, paths connected to the data lines are provided with an amplifier circuit consisting of a decoder 13a, an output amplifier 13b, and an SW3 and a switching circuit consisting of an SW4 and an SW5 as shown in FIG. 14, so that circuits to be used are selected by switching according to a drive mode switching signal for the operation. More specifically, as shown in FIG. 15, in the normal mode for driving the output amplifier 13b, the drive mode switching signal is set to high so as to turn on the SW1 and the SW2 to supply power to the decoder 13a and to the output amplifier 13b and so as to turn off the SW4 and the SW5, by which 8-bit image data is amplified in the output amplifier 13b and output to the data line via the SW3. For driving in the binary mode, the drive mode switching signal is set to low so as to turn off the SW1 and the SW2 to stop the power supply to the decoder 13a and to the output amplifier 13b and so as to turn on or off the SW4 and the SW5 according to a signal of the highest order bit, by which a 1-bit signal is output to the data line.

With this arrangement of the data line drive circuit 13, it is possible to stop the power supply to the decoder 13a and to the output amplifier 13b when displaying e-mail or other binary information, thus enabling a further reduction of power consumption.

The present invention is characterized by partitioning the display memory into a plurality of display memories according to an image type for controlling them. Therefore, for example, for 8-bit image data, it is also possible to store 4-bit image data of one frame in the first to fourth display memories 7a to 7d and to store 4-bit image data of the next frame in the fifth to eighth display memories 7e to 7h. Accordingly, the configuration according to the present invention can be a combination of the first or second embodiment and this embodiment.

In the display memory, the image data of two high order bits may be stored for four consecutive screens or the image data of three high order bits may be stored for two consecutive screens together with the image data of two high order bits for the single screen.

In the display memory, the image data of two high order bits may be stored for four consecutive screens or the image data of three high order bits may be stored for two consecutive screens together with the image data of two high order bits for the single screen.

In addition, the CPU may give a control signal which determines the number of the screens of the image data stored in the display memory and a control signal which determines the number of bits for providing the number of the gradation levels of the image data stored in the display memory.

Fourth Embodiment

Figure 16:
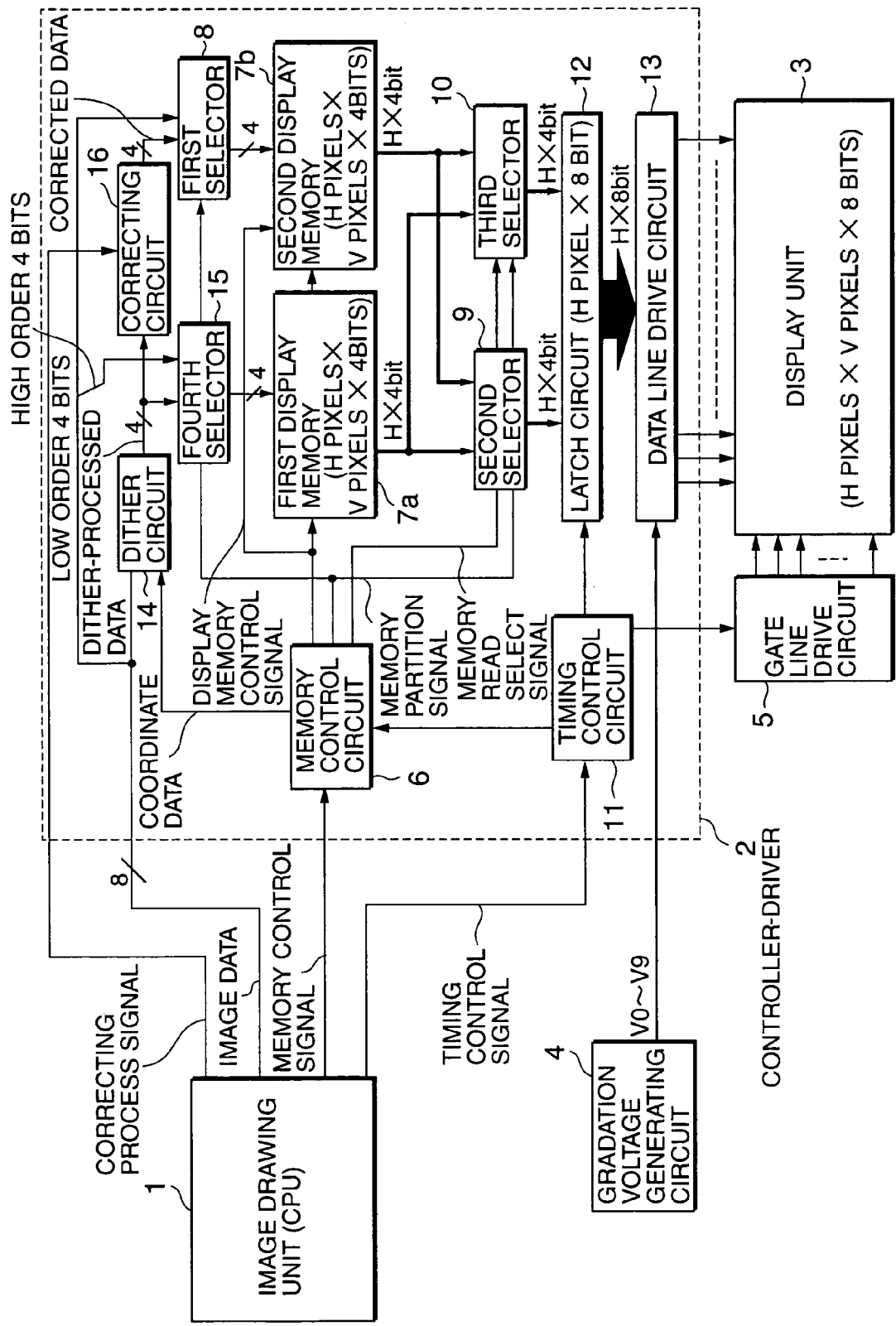
FIG. 16 is a diagram showing a configuration of a display device containing a controller-driver according to a fourth embodiment of the present invention.
Figure 17:
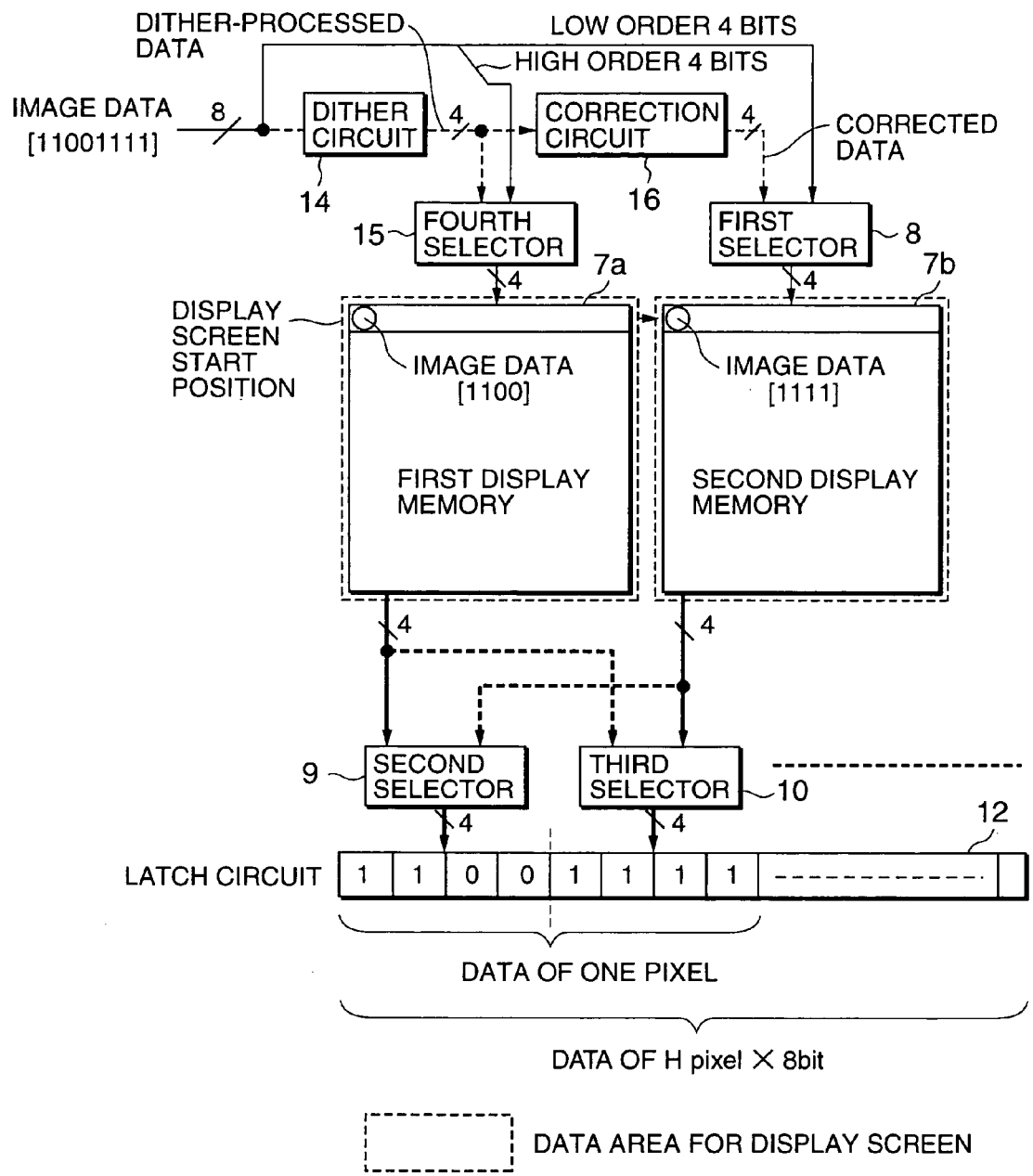
FIG. 17 is a diagram showing an image data flow (when a correction function is not used) in the controller-driver according to the fourth embodiment of the present invention.

The following describes a controller-driver, a display device, and a display method according to a fourth embodiment of the present invention by referring to FIG. 16 to FIG. 19. Referring to FIG. 16, there is shown a diagram of a configuration of a display device containing the controller-driver according to the fourth embodiment. Referring to FIG. 17 and FIG. 18, there are shown image data flows for cases where a correction function is used and not used. Referring to FIG. 9, there is shown a diagram of selector output states.

While the first to third embodiments have been described in the above for a case of performing the scroll function with the display memory partition control of the present invention, it is also possible to perform functions other than the scroll function. Therefore, this embodiment will now be described for a case of performing an image correction function as an example of the functions other than the scroll function.

As shown in FIG. 16, a controller-driver 2 of this embodiment is characterized by that a correction circuit 16 for correcting image data (for example, gamma correction, brightness correction, and contrast highlighting) is set up in an input stage of a first selector 8 in addition to the configuration of the second embodiment and that the correction circuit 16 is controlled according to a correcting process signal from an image drawing unit 1. While the following describes a case of using both of the dither process with the dither circuit 14 and the correcting process with the correction circuit 16, it is also possible to use a configuration where the correction circuit 16 as a feature of this embodiment is added to the configuration of the first embodiment shown in FIG. 1.

An operation of the controller-driver 2 having the above configuration will now be described by using FIG. 17 and FIG. 18. When the correction function is not used, as shown in FIG. 17, a first display memory 7a stores high order 4 bits ("1100" in FIG. 17) of image data that has not been dither-processed by a fourth selector 15 controlled according to a memory partition signal and a second display memory 7b stores low order 4 bits ("1111" in FIG. 17) of image data that has not been corrected by a first selector 8. Thereafter, the data in the first display memory 7a and the data in the second display memory 7b are transmitted to a latch circuit 12 by a second selector 9 controlled according to a memory read select signal and a third selector 10, respectively, by which they are displayed on a display unit 3 as original 8-bit image data.

On the other hand, when the dither function is used, as shown in FIG. 18(a), the first display memory 7a stores dither-processed image data (high order 4 bits: image data "1101" where a carry has been caused by the dither-processed image data "11001111" in this embodiment) by the fourth selector 15 controlled according to the memory partition signal, and the second display memory 7b stores corrected image data (high order 4 bits: "1110" corrected on the dither processed data "1101" in this embodiment) by the first selector 8 after the image data is transmitted from the dither circuit 14 to the correction circuit 16 so as to be corrected in image quality correction processes such as the gamma correction, the brightness correction, and the contrast highlighting by the correction circuit 16. The image data that is stored after correction in the second display memory 7b is different from the image data stored in the first display memory 7a after the dither process.

Thereafter, the second selector 9 and the third selector 10 controlled according to the memory read select signal transmit the data in the display memory 7a to the latch circuit 12 and then the data is displayed on the display unit 3 as 4-bit dither-processed image data.

When the correction function is used, as shown in FIG. 18(b), the first display memory 7a stores the dither-processed image data similarly and the second display memory 7b stores corrected image data by means of the first selector 8 similarly. Thereafter, the second selector 9 and the third selector 10 controlled according to the memory read select signal transmit the data in the second display memory 7b to the latch circuit 12 and then the data is displayed on the display unit 3 as corrected 4-bit image data.

Referring to FIG. 19, there is shown a table of relations between control signals and data output from selectors. A condition where the dither function nor correction function is not used corresponds to the memory partition signal in the off state and the memory read select signal in the on state, where the high order 4 bits of the image data are input to the first display memory 7a by the fourth selector 15 and the low order 4 bits of the image data are input to the second display memory 7*b* by the first selector 8, and where the high order 4 bits of the first display memory 7*a* and the low order 4 bits of the second display memory 7*b* are sent from the second selector 9 and the third selector 10, respectively. Thereafter, they are combined in the latch circuit 12, by which original 8-bit image data is displayed.

A condition where the dither function is used and the correction function is not used corresponds to the memory partition signal in the on state and the memory read select signal in the off state, where the high order 4 bits of dither-processed image data are input to the first display memory 7*a* by the fourth selector 15 and the high order 4 bits of corrected image data are input to the second display memory 7*b* by the first selector 8, and where the high order 4 bits of the dither-processed image data in the first display memory 7*a* are sent from the second selector 9 and the third selector 10. A condition where the correction function is used corresponds to the memory partition signal in the on state and the memory read select signal in the on state, where the high order 4 bits of corrected image data in the second display memory 7*b* are sent from the second selector 9 and the third selector 10.

As an example of using this function, there can be an application to a portable device having a semi-transmissive LCD panel. The semi-transmissive LCD panel serves as a transmissive LCD panel for a display when a backlight is on, while it serves as a high reflective LCD panel for a display by utilizing an outside light when the backlight is off. The gamma characteristic or the like, however, depends on whether the backlight is on or off. Therefore, for example, if the gamma characteristic or the like is adjusted so as to match the optical characteristic of the transmissive LCD panel, it causes a problem of a poor display when the backlight is off. Therefore, settings are made to cause image data for the transmissive LCD panel to be stored in the first display memory 7*a* and image data gamma-corrected so as to fit the characteristic of the high reflective LCD panel to be stored in the second display memory 7*b* and to cause the first to fourth selectors to be controlled in step with the turning on or off of the backlight to switch the image data output to the display unit 3. With the configuration of the controller-driver 2, a good display is achieved independently of whether the backlight is on or off. The type of usage in the above is just an example. Therefore, it is applicable to an arbitrary form in which different types of image data are stored in the first display memory 7*a* and the second display memory 7*b* and data is appropriately selected and displayed.

Fifth Embodiment

Figure 20:
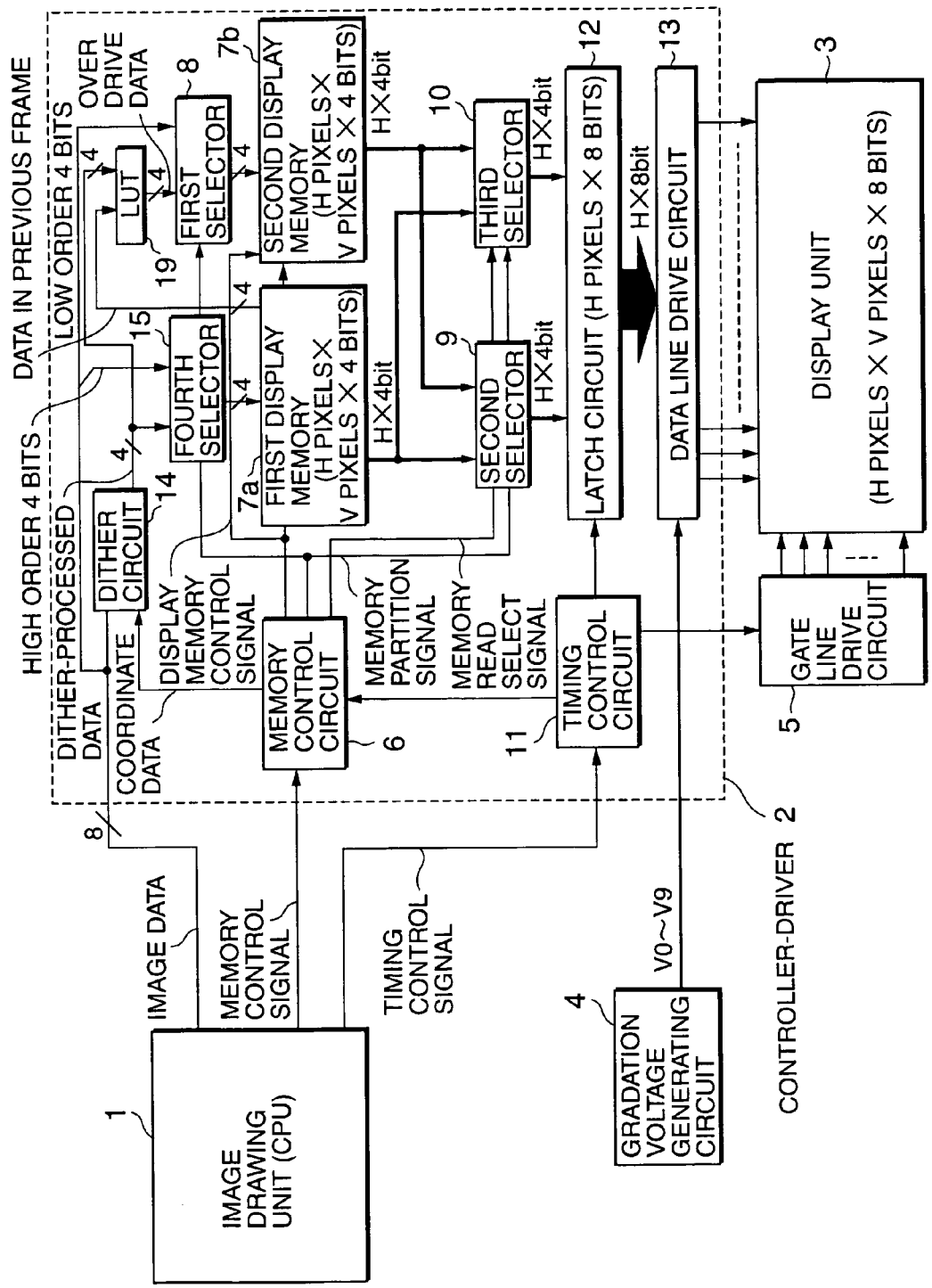
FIG. 20 is a diagram showing a configuration of a controller-driver according to a fifth embodiment of the present invention.
Figure 21:
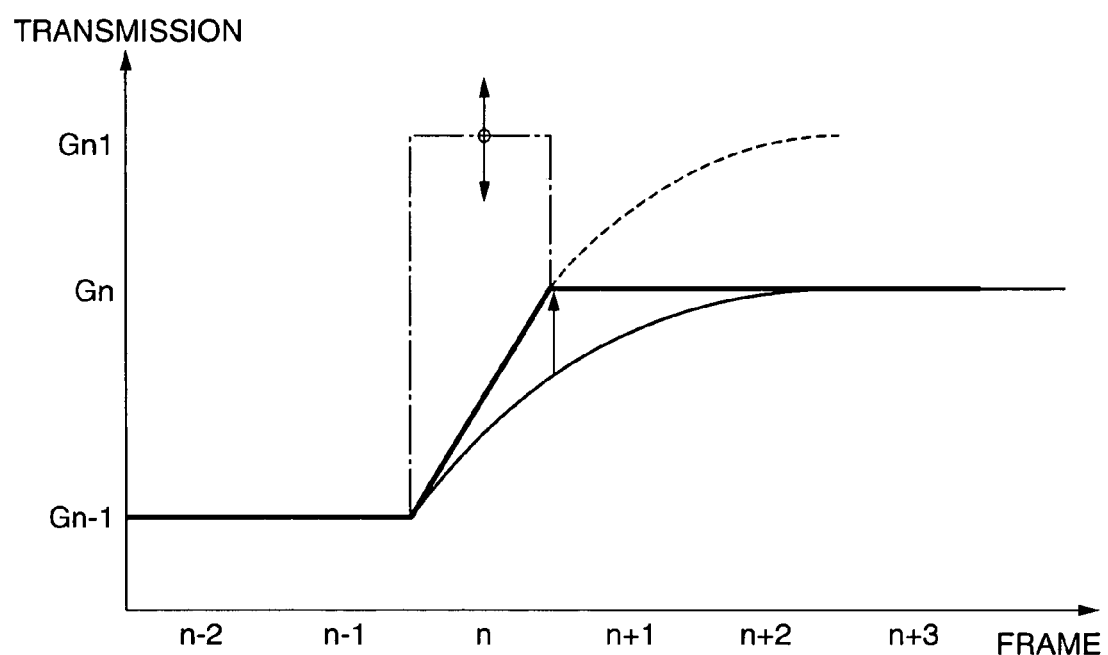
FIG. 21 is a diagram for assistance in explaining over-drive processing.

The following describes a controller-driver, a display device, and a display method according to a fifth embodiment of the present invention by referring to FIG. 20 and FIG. 21. Referring to FIG. 20, there is shown a configuration of a display device containing the controller-driver according to the fifth embodiment. Referring to FIG. 21, there is shown a diagram for assistance in explaining an overdrive operation.

As shown in FIG. 20, the controller-driver 2 of this embodiment is characterized by that a lookup table (LUT) 19 is provided in a previous stage of a first selector 8 in addition to the configuration of the second embodiment and that the second display memory 7*b* stores overdrive data corrected by the LUT 19 as a result of comparing data of the preceding with that of the following frame. While the following describes a configuration in which there is provided a dither circuit 14 for performing dither processing, it is also possible to use a configuration in which the LUT 19 is provided in the configuration of the first embodiment shown in FIG. 1.

The overdrive operation will now be generally described with reference to FIG. 21. An abscissa axis in FIG. 21 represents a frame and an ordinate axis represents a relative value of transmittance. In a liquid crystal display (LCD), a liquid crystal molecule is rotated by applying a voltage to two opposing substrates or to a portion between electrodes of one substrate and a light transmittance state is changed according to the rotation to control a display. The liquid crystal, however, is driven according to a speed of response determined by an elastic constant to distortion such as spreading, twisting, and bending, a thickness of a liquid crystal cell, a dielectric constant, and the like. Therefore, even if an applied voltage is switched, the transmittance does not change immediately, but changes gradually at a predetermined time constant as indicated by a thin solid line in FIG. 21. The liquid crystal characteristic prevents a response of the liquid crystal molecule from following the applied voltage when displaying data requiring fast screen switching, thus causing deterioration of a display quality. Accordingly, for a display having different gradation data, the liquid crystal is driven as indicated by a dashed line in FIG. 21 by applying a voltage higher or lower (a higher voltage indicated by a dash-single-dot line in FIG. 21) than the gradation voltage of image data to be displayed, the speed of response is increased and the transmittance can be changed as indicated by a heavy solid line.

Therefore, in this embodiment, in order to perform the above overdrive operation, image data in the previous frame dither-processed by the fourth selector 15 controlled according to the memory partition signal into the first display memory 7*a*, the image data in the previous frame stored in the first display memory 7*a* and the image data in the current frame transmitted from the dither circuit 14 are input to the LUT 19, they are converted to overdrive data by referring to the data stored in the LUT 19, and the converted image data is stored in the second display memory 7*b* by the first selector 8 controlled according to the memory partition signal. The data for overdrive (overdrive data) stored in the second display memory 7*b* is different from the image data of the previous frame stored in the first display memory 7*a* after the dither process.

Thereafter, the data in the second display memory 7*b* is transmitted to the latch circuit 12 by using the second selector 9 and the third selector 10 controlled according to the memory read select signal and it is displayed on the display unit 3. In this manner, the first display memory 7*a* is used as a work memory for the overdrive operation, by which the display unit 3 receives an output of the image data converted for the overdrive from the second display memory 7*b*, thus enabling the overdrive operation for improving the speed of the liquid crystal response without adding a display memory. For a static image, the original image data, namely, 8-bit image data can be displayed in the same manner as for the case where the scroll function is not used in the first or second embodiment.

Sixth Embodiment

Figure 22:
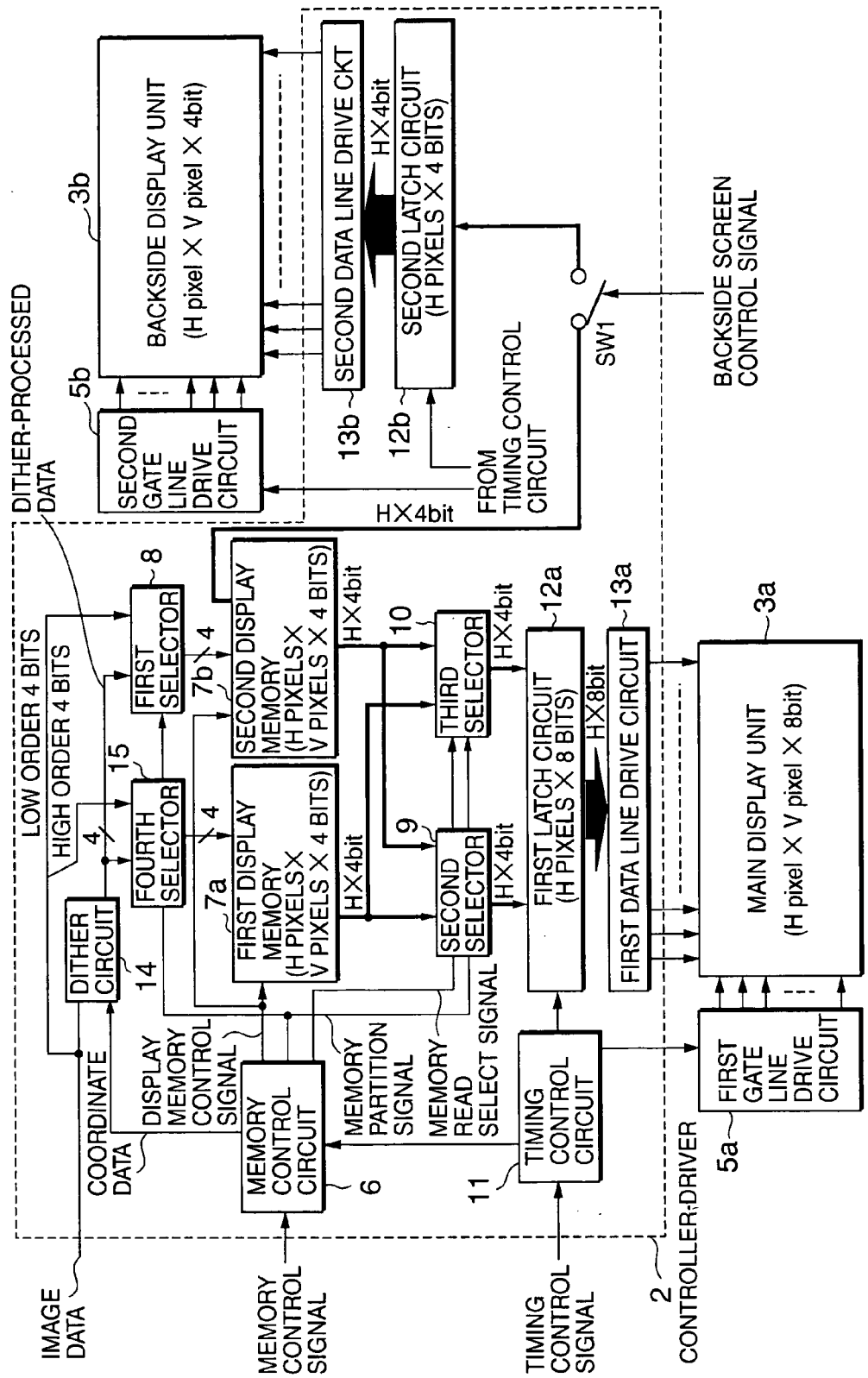
FIG. 22 is a diagram showing a configuration of a display device containing a controller-driver according to a sixth embodiment of the present invention.
Figure 23:
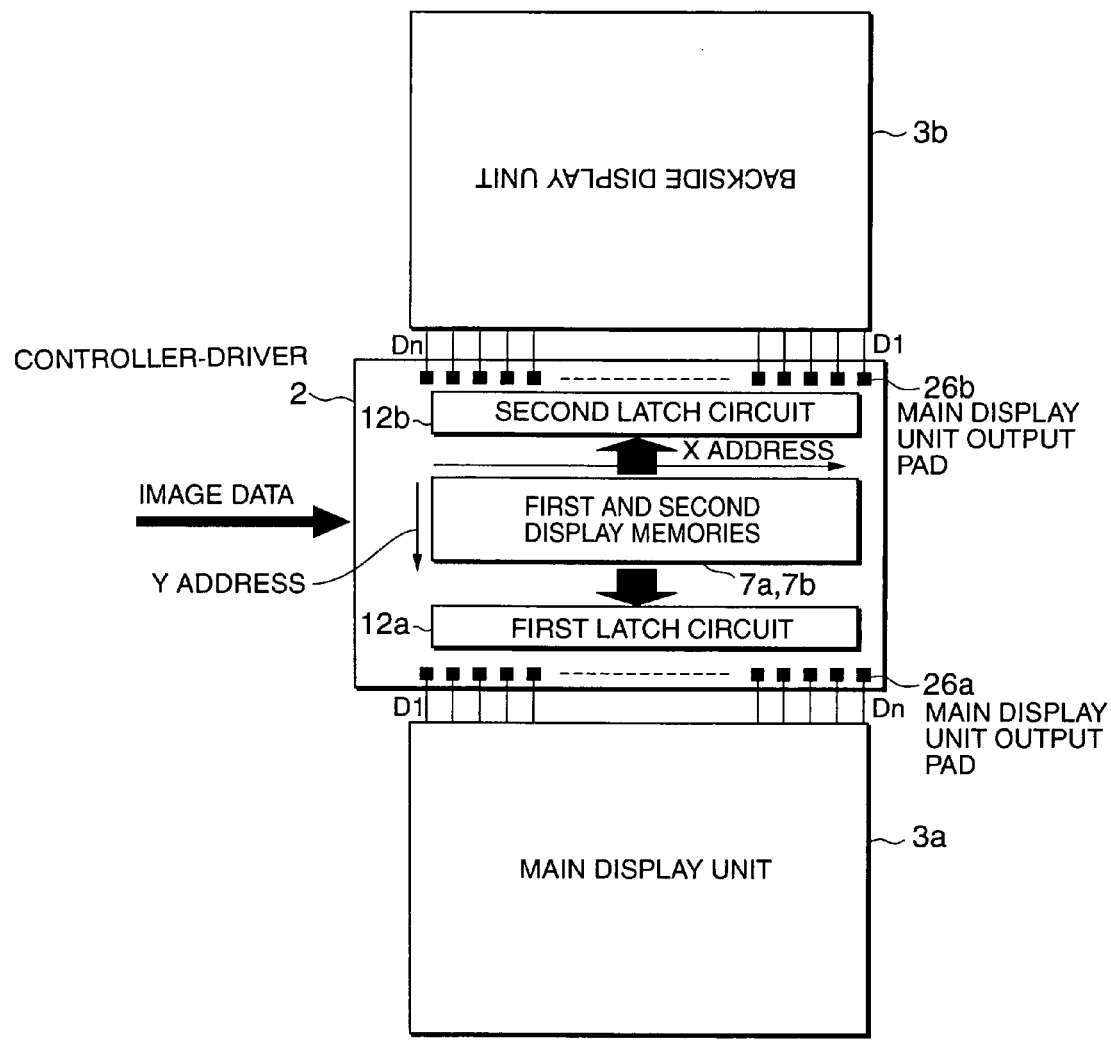
FIG. 23 is a diagram showing an arrangement relation between a chip layout of the controller-driver according to the sixth embodiment of the present invention and a display unit.
Figure 30:
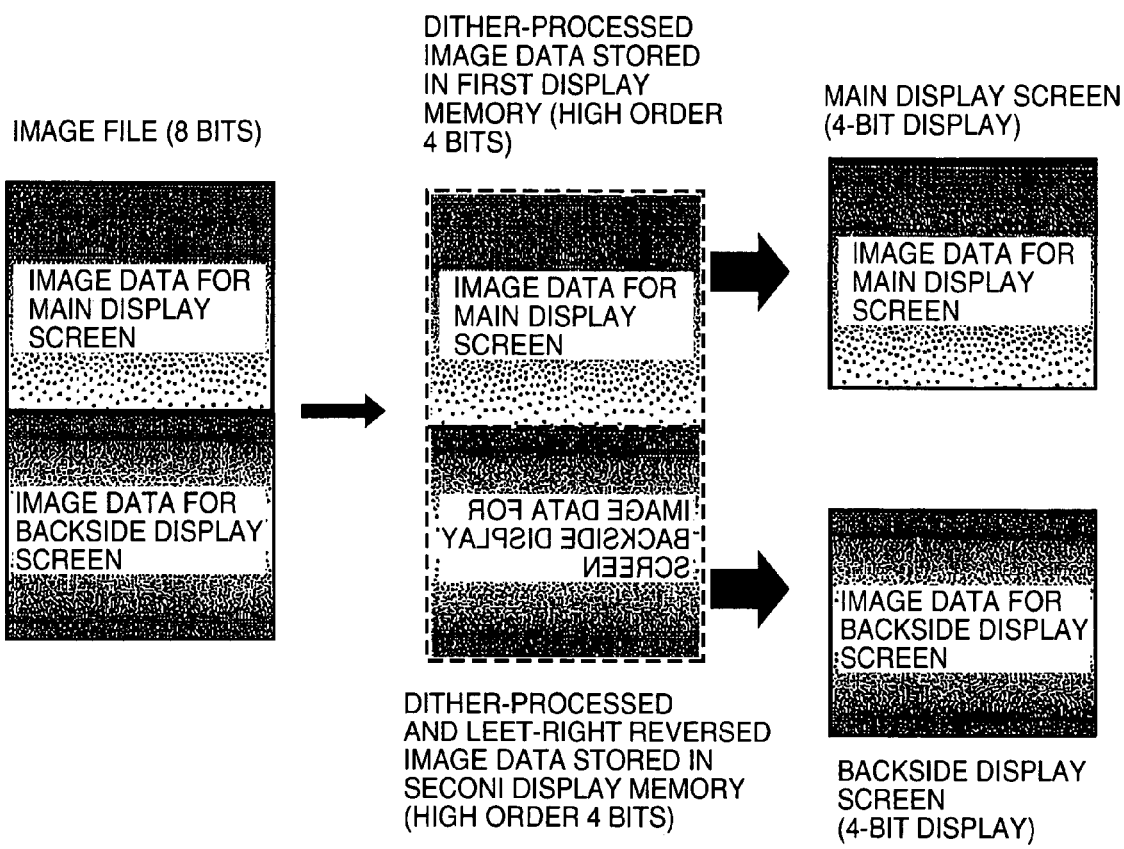
FIG. 30 is a diagram showing an example of display screens (when different image data are output to the main display screen and the backside display screen) with the controller-driver according to the sixth embodiment of the present invention.
Figure 31:
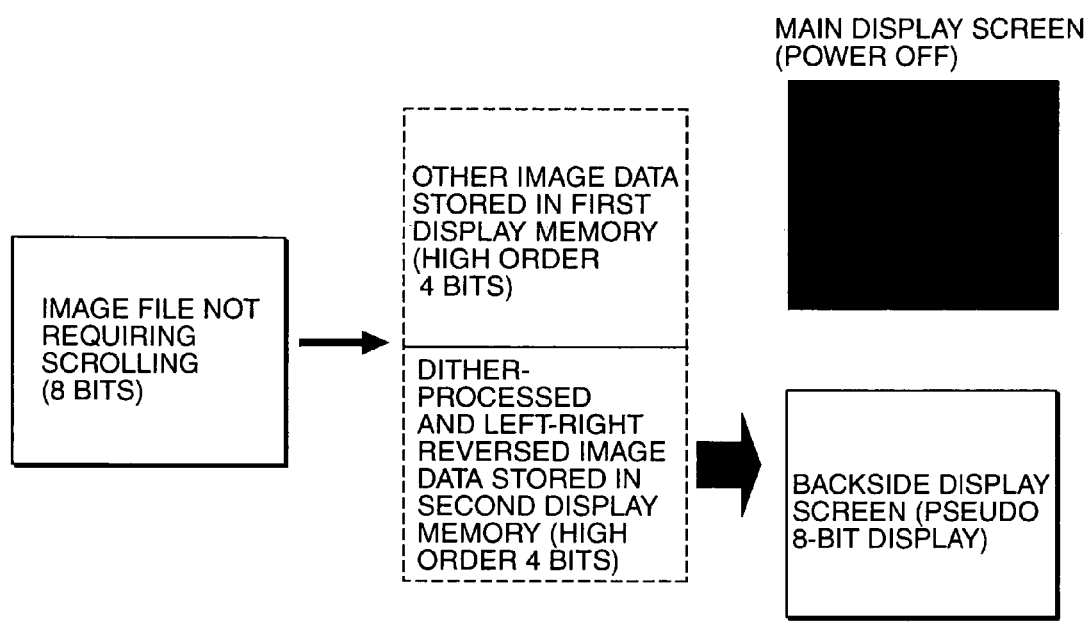
FIG. 31 is a diagram showing an example of display screens (when only the backside display screen is used) with the controller-driver according to the sixth embodiment of the present invention.
Figure 32:
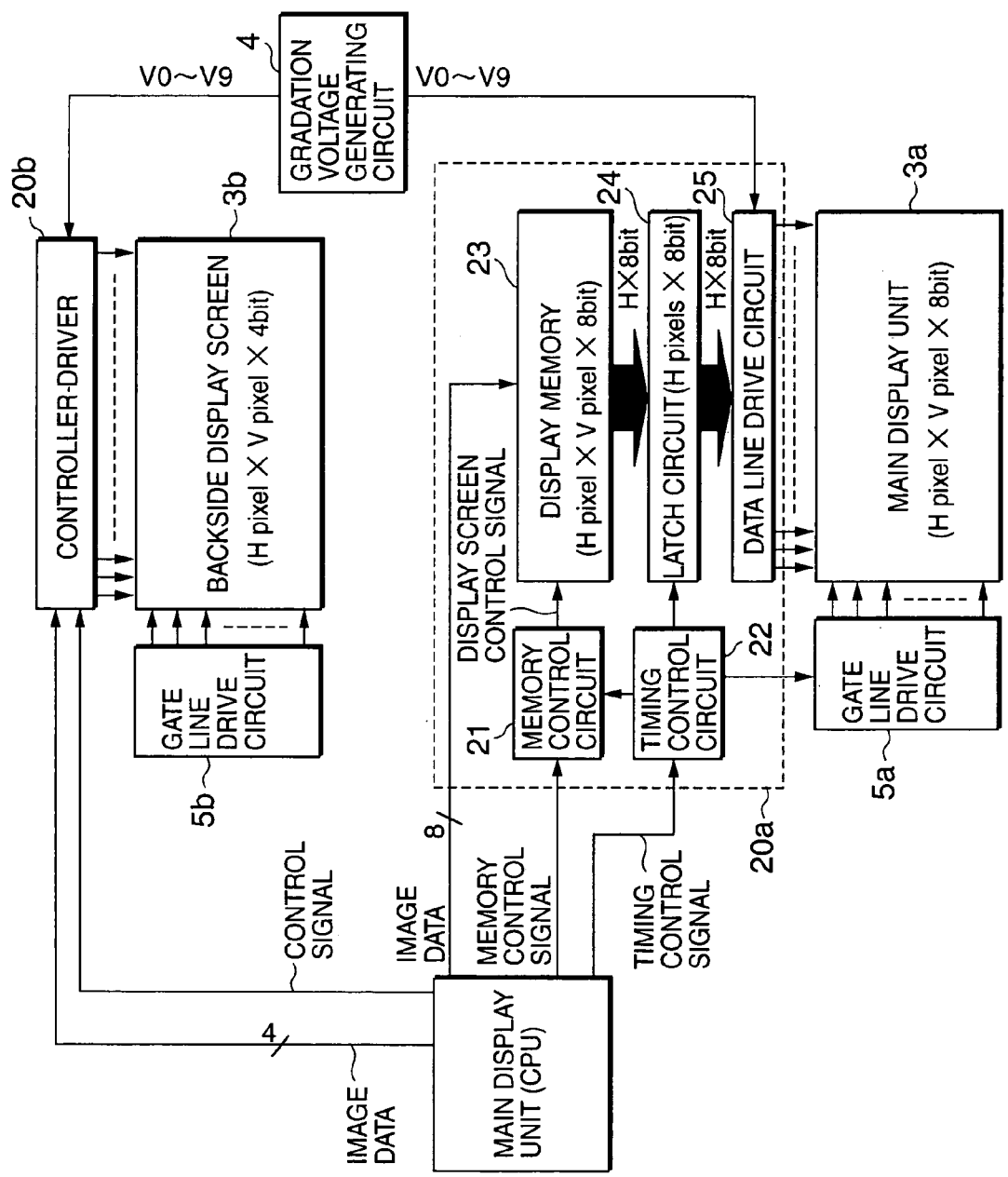
FIG. 32 is a diagram showing an outline configuration of a cellular phone having a conventional backside screen display.

The following describes a controller-driver, a display device, and a display method according to a sixth embodiment of the present invention by referring to FIG. 22 to FIG. 32. Referring to FIG. 22, there is shown a configuration of a display device containing a controller-driver according to the sixth embodiment. Referring to FIG. 23, there is shown a diagram of an arrangement relation between a chip layout of the controller-driver and display units. Referring to FIG. 24 to FIG. 27, there are shown image data flows for cases where only a main display screen is used, where a backside display screen is used (the same image data is output to the main display screen and the backside display screen), where a backside display screen is used (different image data is output to the main display screen and the backside display screen), and where only the backside display screen is used. Referring to FIG. 28 to FIG. 31, there are shown examples of the respective display screens. Referring to FIG. 32, there is shown a diagram of an outline configuration of a cellular phone having a conventional backside screen display.

Folding-type cellular phones are prevailing since the form achieves downsizing of the entire device and a large display screen. The folding cellular phone, however, is inconvenient for use in that the display unit need be tipped up whenever it receives an incoming call since the display screen is normally put in a hidden condition and therefore a user cannot check the display when the cellular phone is folded. To resolve the problem, there has been suggested a cellular phone having a backside display screen besides the main display screen (for example, in Japanese Unexamined Patent Publication No. 2002-141993). The cellular phone having a backside display screen has, for example, a backside display unit 3b of H pixels×V pixels×4 bits in addition to a main display unit 3a of H pixels×V pixels×8 bits as shown in FIG. 32, so that a user can check an incoming call or e-mail without opening nor closing the cellular phone with a display on the backside display unit 3b. The conventional cellular phone having the backside display screen, however, requires a controller-driver 20b besides a circuit for driving the main display unit 3a to drive the backside display unit 3b, thus causing a problem of increasing a cost, power consumption, and a driver mounting area.

Therefore, in this embodiment, the main display unit 3a and the backside display unit 3b are driven by a single-chip controller-driver 2 to prevent the above problem also when the cellular phone is provided with a backside display unit. Specifically, as shown in FIG. 22, the controller-driver 2 for driving the main display unit 3a contains a second latch circuit 12b for the backside display unit 3b, a second data line drive circuit 13b, and a SW1 controlled according to a backside screen control signal input from an image drawing unit 1 (not shown) in addition to the configuration of the first embodiment shown in FIG. 1 or the configuration of the second embodiment shown in FIG. 7.

Referring to FIG. 23, there is shown an arrangement relation between the chip layout of the controller-driver 2 and the display units. The first display memory 7a and the second display memory 7b are arranged almost in the center of the chip. A first latch circuit 12a with a main display unit output PAD 26a and a second latch circuit 12b with a backside display unit output PAD 26b are disposed in a symmetrical position about the display memories. The image data readout from the display memory of the main display unit 3a and the image data readout from the display memory of the backside display unit 3b are performed symmetrically about the display memories. Therefore, the screen displayed on the backside display unit 3b has an x address left-right reversed. Furthermore, a view of the backside display screen from the rear side shows a display having the same direction as on the main display screen. While the arrangement of the display memories and the latch circuits is not limited to one in FIG. 23, it is advantageous in that the wiring length between the display memories and the first latch circuit 12a can be almost the same as one between the display memories and the second latch circuit 12b.

The following describes the image data flows for using two display screens appropriately by referring to FIG. 24 to FIG. 27.

Figure 24:
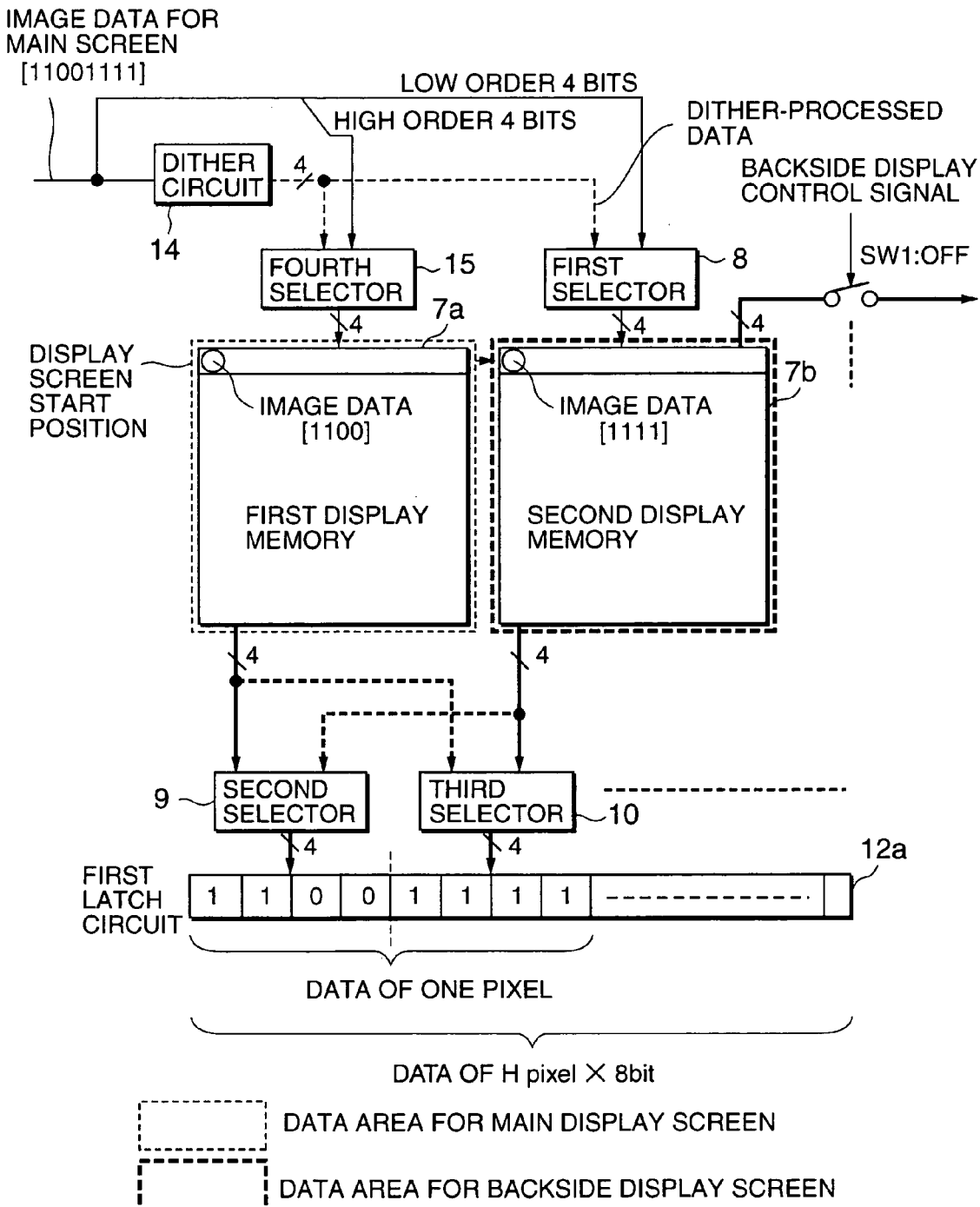
FIG. 24 is a diagram showing an image data flow (when only a main display screen is used) in the controller-driver according to the sixth embodiment of the present invention.

Referring to FIG. 24, there is shown an image data flow for a case where only the main display screen is used (the backside display screen: no display). A fourth selector 15 selects high order 4 bits of image data for the main display screen and the high order 4 bits of image data are stored in the first display memory 7a. A first selector 8 selects low order 4 bits of image data for the main display screen and the low order 4 bits of image data (the high order 4 bits of image data stored in the first display memory 7a) are stored in the second display memory 7b. A second selector 9 selects output data from the first display memory 7a (the high order 4 bits of image data) and a third selector 10 selects output data from the second display memory 7b (the low order 4 bits of image data). Then, the first latch circuit 12a sequentially stores 8-bit image data and the main display unit 3a displays 8-bit image data.

Figure 28:
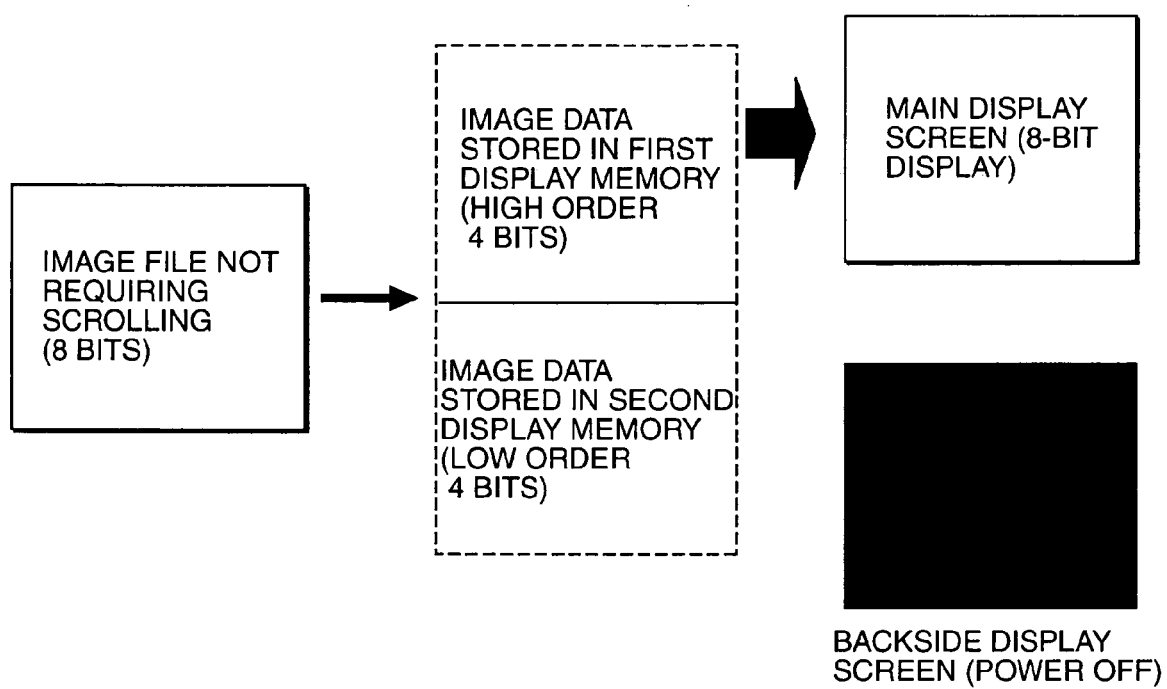
FIG. 28 is a diagram showing an example of display screens (when only the main display screen is used) with the controller-driver according to the sixth embodiment of the present invention.

At this point, the SW1 is turned off according to a backside screen control signal and none is displayed on the backside display unit 3b. It should be noted that the power consumption is reduced by halting the power supply to the second data line drive circuit 13b, a second gate line drive circuit 5b, and the second latch circuit 12b for driving the backside display unit 3b. Referring to FIG. 28, there is shown a diagram typically showing a relation between the image data stored in the display memories and the display screens. As shown, the main display screen displays the original 8-bit image data with a combination of the image data stored in the first display memory 7a and the second display memory 7b.

Figure 25:
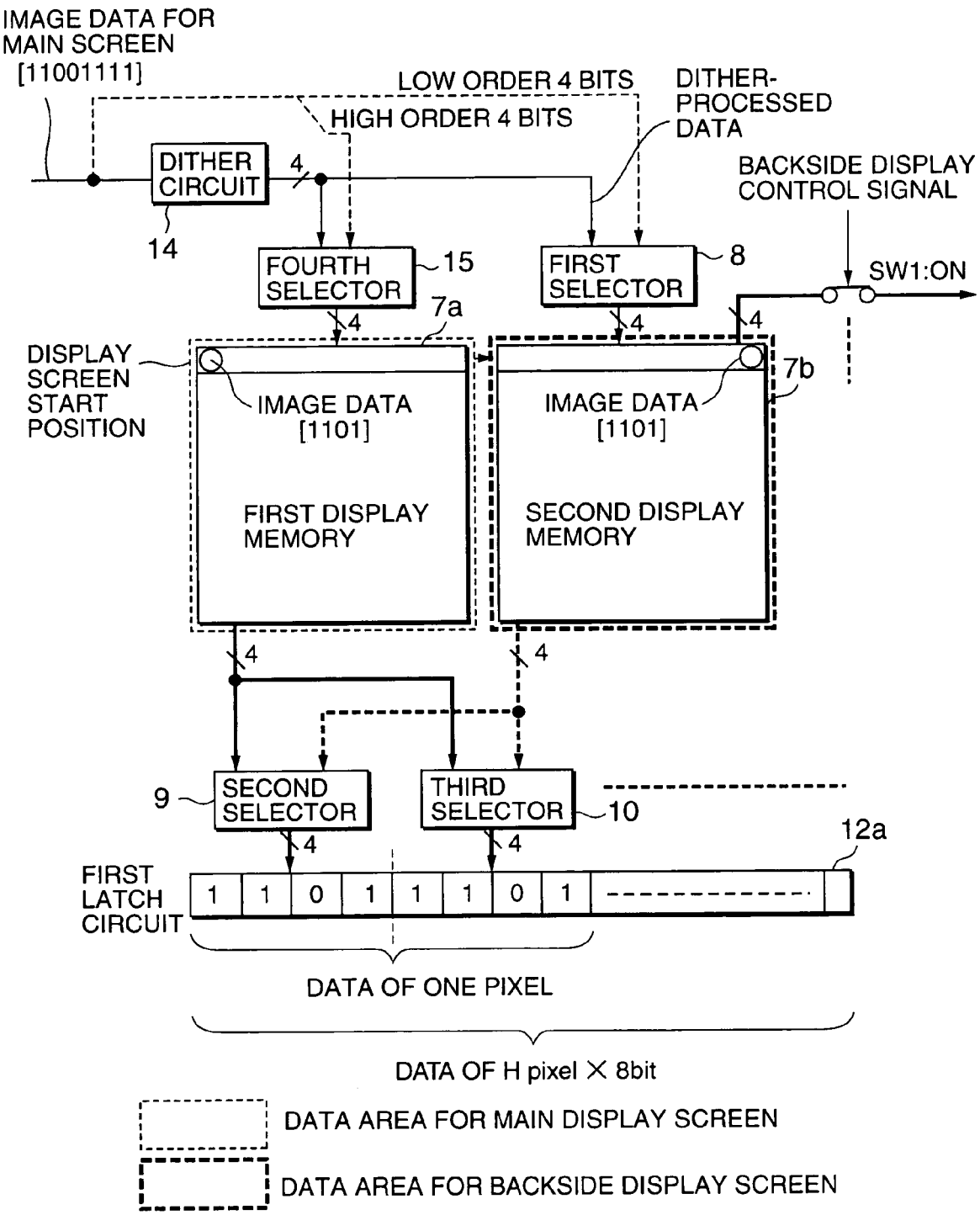
FIG. 25 is a diagram showing an image data flow (when the same image data is output to the main display screen and the backside display screen) in the controller-driver according to the sixth embodiment of the present invention.

Referring to FIG. 25, there is shown an image data flow for a case where the backside display (or sub-display) screen is used (when the same image data is output to the main display screen and the backside display screen). The fourth selector 15 selects the high order 4 bits of image data for the main display screen dither-processed by a dither circuit 14 and the first display memory 7a stores the high order 4 bits of the dither-processed image data. In the same manner as for the fourth selector 15, the first selector 8 also selects the high order 4 bits of the dither-processed image data for the main display screen and the second display memory 7b stores the high order 4 bits of the dither-processed image data in a left-right reversed condition. The image data for the backside display screen stored in the second display memory 7b is different from the image data for the main display screen stored in the first display memory 7a.

The second selector 9 selects output data from the first display memory 7a (the high order 4 bits of the dither-processed image data). Simultaneously with that, the third selector 10 also selects output data from the first display memory 7a (the high order 4 bits of the dither-processed image data). The first latch circuit 12a sequentially stores the 4-bit image data stored in the first display memory 7a in an area for storing the high order 4 bits and the low order 4 bits and the main display unit 3a displays the 4-bit dither-processed image (pseudo 8-bit display).

Figure 29:
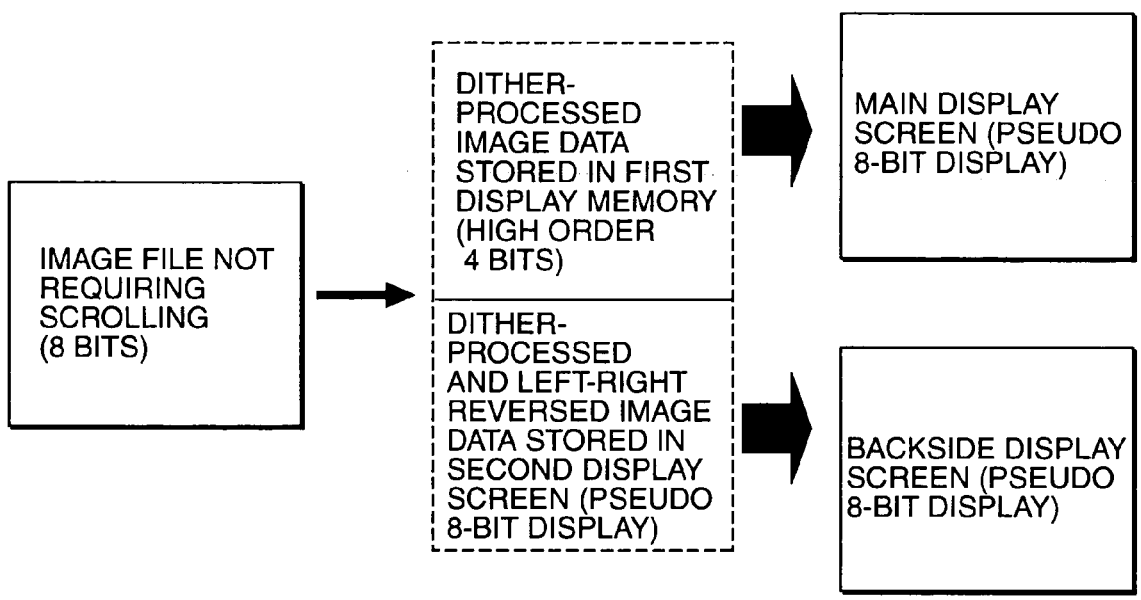
FIG. 29 is a diagram showing an example of display screens (when the same image data is output to the main display screen and the backside display screen) with the controller-driver according to the sixth embodiment of the present invention.

The SW1 is turned on according to the backside screen control signal, by which output data from the second display memory 7b (the high order 4 bits of dither-processed image data: the left-right reversed image data in the first display memory 7a) is sequentially stored into the second latch circuit 12b of the backside display unit 3b and the backside display unit 3b displays the same 4-bit dither-processed image (pseudo 8-bit display) as the image displayed on the main display unit 3a. With the execution of the above control, the same display can be made on the backside display screen on the back of the main display screen. Referring to FIG. 29, there is shown a diagram typically showing a relation between the image data stored in the display memories and the display screens. As shown, the main display screen displays the image data stored in the first display memory 7a and the backside display screen displays readout image data left-right reversed and stored in the second display memory 7b, thus enabling the same image data to be displayed on both screens with the backside display screen viewed from behind.

Figure 26:
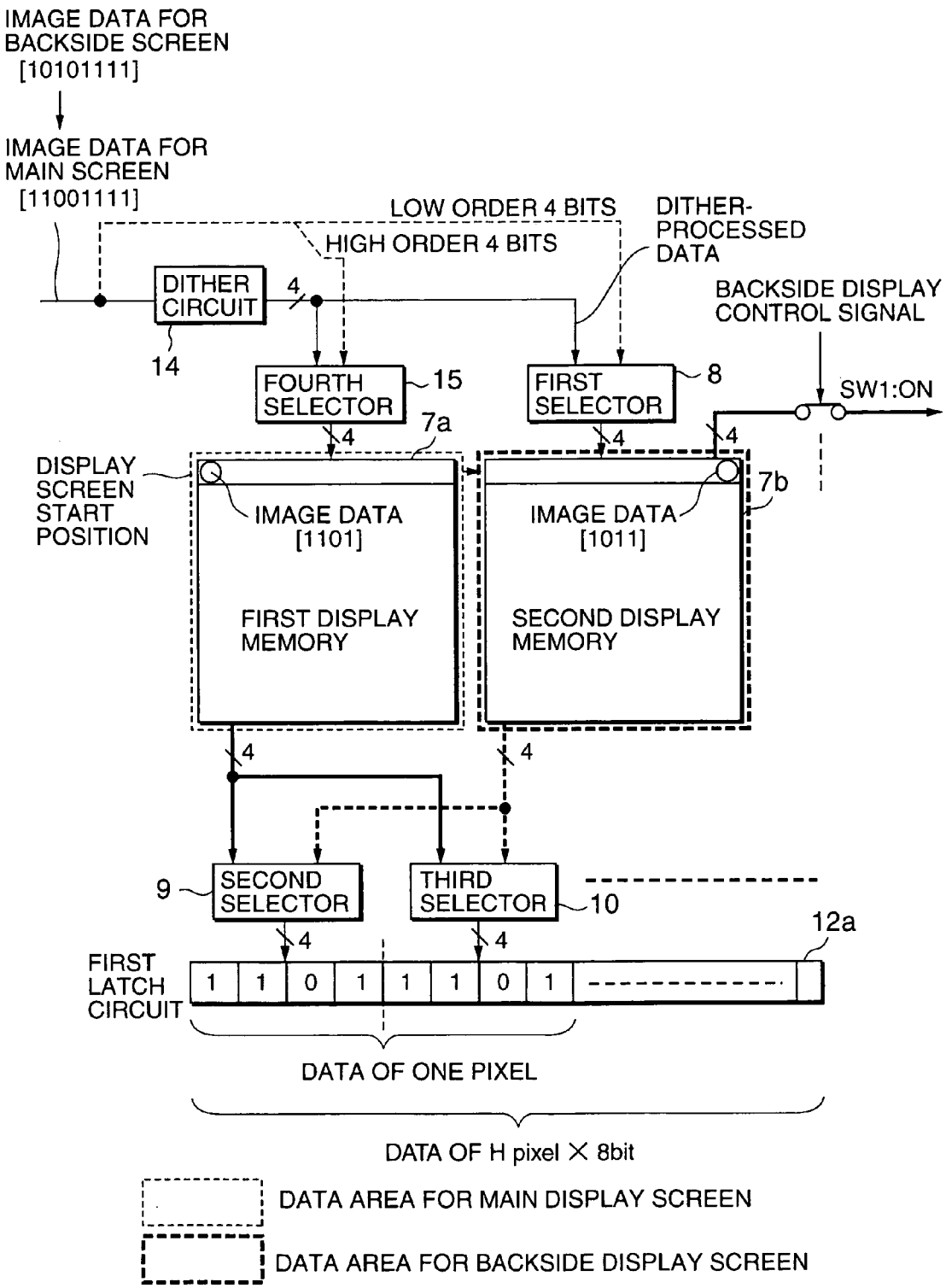
FIG. 26 is a diagram showing an image data flow (when different image data are output to the main display screen and the backside display screen) in the controller-driver according to the sixth embodiment of the present invention.

Referring to FIG. 26, there is shown an image data flow for a case where the backside display screen is used (when different image data is output on the main display screen and the backside display screen). The fourth selector 15 selects the high order 4 bits of the dither-processed image data for the main display screen and the first display memory 7a stores the high order 4 bits of the dither-processed image data for the main display screen. The first selector 8 selects the high order 4 bits of the dither-processed image data for the backside display screen and the second display memory 7b stores the high order 4 bits of the dither-processed image data for the backside display screen in a left-right reversed condition. The image data for the backside display screen stored in the second display memory 7b is different from the image data for the main display screen stored in the first-display memory 7a.

The second selector 9 selects output data from the first display memory 7a (the high order 4 bits of the dither-processed image data) and the third selector 10 selects output data from the first display memory 7a (the high order 4 bits of the dither-processed image data for the main display screen). The first latch circuit 12a sequentially stores 4-bit image data stored in the first display memory 7a in the area for storing the high order 4 bits and the low order 4 bits and the main display unit 3a displays 4-bit dither-processed image data (pseudo 8-bit display).

The SW1 is turned on according to the backside screen control signal, by which output data from the second display memory 7b (the high order 4 bits of dither-processed and left-right reversed image data on the backside display screen) is sequentially stored into the second latch circuit 12b of the backside display unit 3b and the backside display unit 3b displays a 4-bit image from dither-processed image data for the backside display different from the image displayed on the main display unit 3a (pseudo 8-bit display). The execution of the above control enables the different screens to be displayed on the main display screen and the backside display screen. Referring to FIG. 30, there is shown a diagram typically showing a relation between the image data stored in the display memories and the display screens.

Figure 27:
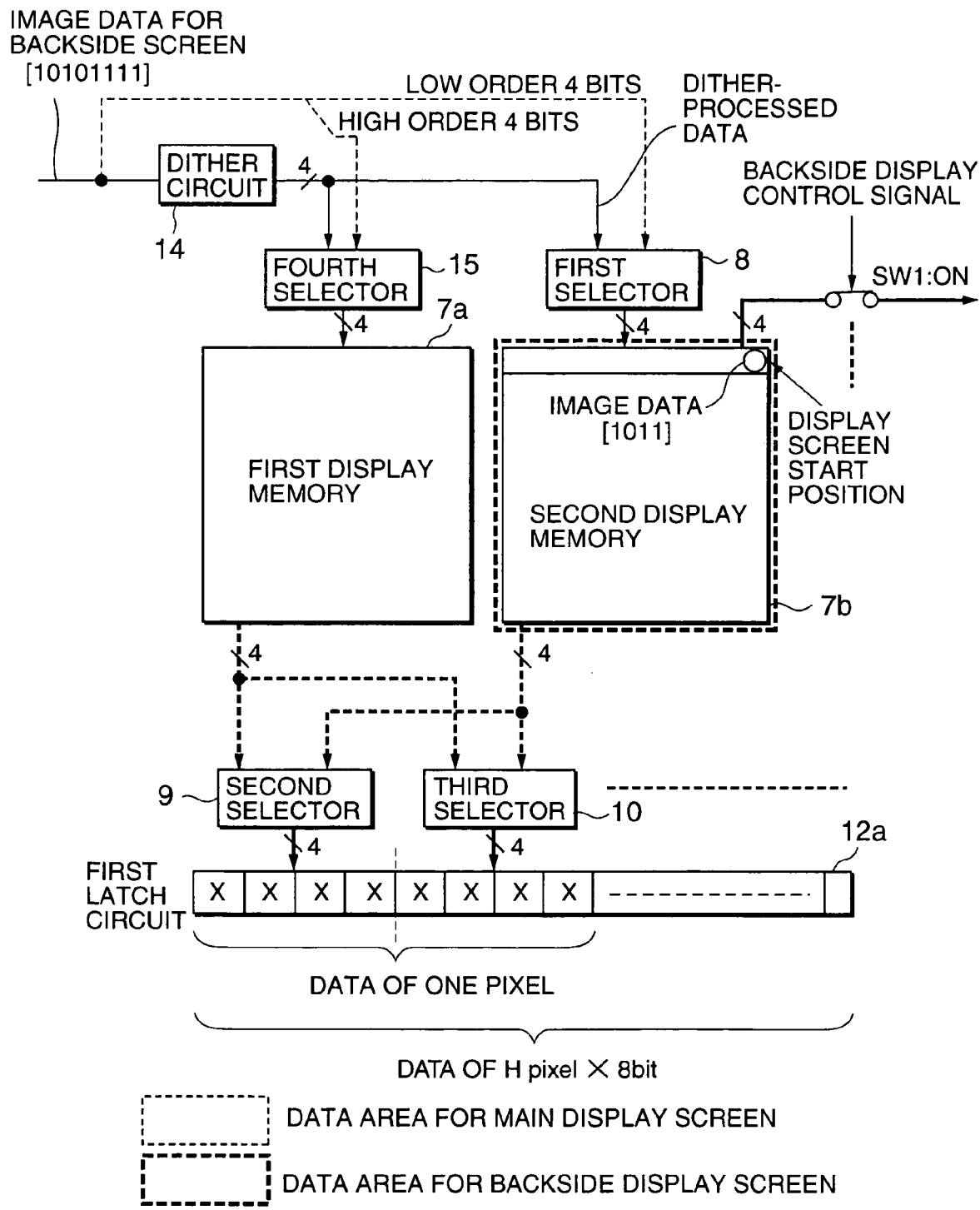
FIG. 27 is a diagram showing an image data flow (when only the backside display screen is used) in the controller-driver according to the sixth embodiment of the present invention.

Referring to FIG. 27, there is shown an image data flow for a case where only the backside display screen is used (the main display screen: no display). The fourth selector 15 and the first selector 8 select high order 4 bits of dither-processed image data for the backside display screen and the second display memory 7b stores the 4 bits of the dither-processed image data for the backside display screen in the left-right reversed condition. At this point, the first display memory 7a is inhibited to store the image data by a halt of the write operation according to the display memory control signal.

In addition, the SW1 is turned on according the backside screen control signal, by which output data from the second display memory 7b (the high order 4 bits of the dither-processed and left-right reversed image data on the backside display screen) is sequentially stored in the second latch circuit 12b of the backside display unit 3b and the backside display unit 3b displays a 4-bit image from the dither-processed backside display image data (pseudo 8-bit display). It should be noted that the power consumption is reduced by halting the power supply to a first data line drive circuit 13a, a first gate line drive circuit 5a, and a first latch circuit 12a for driving the main display unit 3a. The execution of the above control enables a display only on the backside display screen without display on the main display unit. Referring to FIG. 31, there is shown a diagram typically showing a relation between the image data stored in the display memories and the display screens.

In this manner, a plurality of partitioned display memories are used as a memory area for the main display screen and a memory area for the backside display screen in an arrangement for a 2-screen display of the main display screen and the backside display screen, by which the 2-screen display is achieved without adding any display memory. Furthermore, latch circuits and other components are disposed symmetrically about the display memories, thereby achieving almost the same wiring lengths and keeping the equivalent display qualities on the main display screen and the backside display screen.

As set forth hereinabove, the controller-driver, the method of driving the controller-driver, and the method of processing image data according to the present invention have the following effects.

A first effect of the present invention is that a screen can be scrolled without a transfer of image data from the image drawing unit (CPU) to the controller-driver.

It is because, a display memory of one frame is partitioned and controlled in units of a plurality of bits, by which image data can be bit-divided and stored in the display memories in the same manner as for the conventional one when the scroll function is not used, while image data of a plurality of frames can be stored in the display memories and required image data can be read from the display memories and displayed in such a way as to be correspondent to scrolling when the scroll function is used.

A second effect of the present invention is that it is possible to display a corrected image and to perform an overdrive processing without adding a display memory.

It is because partitioned or subdivided display memories are used as a storage area for processed image data or as a work memory area under processing, thereby enabling a display of corrected data or converted image data with the reference to LUT together with the normal image display.

A third effect of the present invention is that it is possible to prevent increases of the cost, power consumption, and mounting area in the configuration having two display screens.

It is because the display memory is used as a data storage area for a backside display or a sub-display screen, thereby eliminating a need for providing a controller-driver with a built-in memory dedicated to the backside display screen. In addition, when the display memory is partitioned into two for controlling, latch circuits and other components are disposed symmetrically about the display memories, thereby enabling equivalent wiring lengths and equivalent display qualities on the two screens.

With this structure, it is possible to deal with different data in the controller-driver without increasing a memory capacity of the display memory included in the controller-driver. This shows that a scroll operation and low power consumption can be concurrently accomplished with degradation of an image quality suppressed. Moreover, correction process and overdrive process can be readily achieved.

While the present invention has thus far been described in conjunction with several embodiments thereof, it will be readily understood to put the present invention into practice in various other manner. For example, the controller-driver according to the present invention may be realized by a single chip or a plurality of chips. For example, when the gate line driving circuit 5, the controller-driver 2, the gradation level voltage generation circuit 4 all of which are illustrated in FIG. 1 are formed within the single chip, it is possible to reduce a chip cost and/or to reduce an implementation cost on chip-on-glass (COG). Furthermore, when the CPU is also included in the single chip, electric power consumption would be expected to be reduced because a wiring load can be reduced.

The present invention may adopt a structure of the display unit and the controller-driver, such as SOG-LCD (System On Glass-Liquid Crystal Display), that is integrated on a glass substrate and that has both an integrated circuit function and a display function. This structure dispenses with an implementation cost of the controller-driver and is therefore more effective to reduce a cost.

Although the dither process circuit alone has been described as an example of the color decrease circuit in the embodiment 2 so as to realize pseudo-gradation level representation, an error or a difference spread process may be executed for decreasing colors. In the embodiment 2, the controller-driver is included in the dither circuit. However, the color decrease process, such as the dither process, may be carried out outside of the controller-driver and may be executed, for example, in the CPU. Specifically, when the color decrease process is executed outside of the controller-driver, the controller-driver may be given, for example, the image data for two consecutive screens (namely, first and second screens) subjected to the color decrease process. This makes it possible to supply the controller-driver with the image data of the first and the second screens in series or in parallel. For example, when the image data of four bits subjected to the color decrease process is given to a bus of 8 bits, the image data for two screens may be sent in parallel. In this event, simultaneous write-in operation can be executed for the first and the second display memories and, therefore, image data can be transferred from the CPU to the controller-driver at a high speed.

In FIG. 2, judgment is made about whether the input image data should be decreased in the number of gradation levels. To this end, an example of a judgment circuit is to judge whether or not a scroll operation is to be carried out. However, the above-mentioned judgment can be made either by comparing the memory capacity of the controller-driver with an amount of the input image data or by detecting whether or not the desired processing is needed on the image data.

In addition, the memory area used in the controller-driver according to the controller-driver may have a memory capacity enough to store the image data for the single screen. For example, the present invention is applicable to a memory area that has a memory capacity for 1.2 screens.

At any rate, when the number of the gradation levels is down by or reduced to 50%, the image data for two screens can be stored at a half number of the gradation levels in the memory area. Likewise, when the number of the gradation levels is down by 40%, it is possible to store the image data for three consecutive screens, although the number of the gradation levels is reduced as compared with the number of the gradation levels for the reduction to 50%. Furthermore, when the number of gradation levels is reduced to 60%, the image data for two consecutive screens can be stored with a high gradation level in comparison with the reduction to 50%.

Moreover, when the display memory included in the controller-driver has a memory capacity equivalent to the data amount necessary for the single screen defined by H pixels×V pixels×n bits, no superfluous memory capacity is left in the display memory. This means that display control can be most effectively carried out.

What is claimed is:

1. A display driver comprising:
   a memory area which has a storage capacity for storing an amount of image data that is enough to display a single screen, each image data being composed of a plurality of bits; and
   a memory control circuit for storing, in a first mode, a whole of the image data of the plurality of bits into the memory area and for storing, in a second mode, a part of the image data of the plurality of bits into the memory area to leave an empty area in the memory area.

2. A display driver as claimed in claim 1, wherein the part of the image data formed by the plurality of bits is a predetermined number of high order bits within a plurality of bits representative of the number of gradation levels.

3. A display driver as claimed in claim 2, wherein the memory area is divided into a plurality of subdivided memory areas that are equal in number to the bit number providing the gradation levels of the image data given by the plurality of bits;
   in the first mode, the image data being divided at every one bit for the plurality of bits corresponding to the number of the gradation levels and the whole of the image data divided at every one bit being stored in the plurality of the subdivided memory areas;
   in the second mode, the highest order bit of the plurality of bits forming the number of the gradation levels in the image data being stored as the part of the image data into a selected one of the subdivided memory areas.

4. A display driver as claimed in claim 3, wherein, in the second mode, a display screen is driven on or off by a binary drive operation, corresponding to the image data stored in the selected one of the subdivided memory areas.

5. A display driver as claimed in claim 1, wherein, in the second mode, image data different from the above-mentioned image data of the plurality of bits is input and desired high order bit or bits within the number of the gradation levels of the different image data are stored in the empty area in the memory area.

6. A display driver as claimed in claim 5, wherein the image data different from the above-mentioned image data is specified by image data that is next to a current screen in consecutive screens or image data that is obtained by subjecting, to predetermined processing, the image data stored in the memory area as a part of the image data formed by the plurality of bits.

7. A display driver as claimed in claim 1, wherein, in the second mode, the image data of the plurality of bits converted into a prescribed number of bits and subjected to a color decrease process is input;
   the image data of the plurality of bits converted into the prescribed number of bits and subjected to the color decrease process being used as the part of the image data formed by the plurality of bits.

8. A display driver as claimed in claim 7, wherein, in the second mode, the image data of the plurality of bits converted into the prescribed number of bits and subjected to the color decrease process are input in parallel with image data of a plurality of bits obtained by converting different image data into a desired number of bits and subjecting the same to a color decrease process.

9. A display driver as claimed in claim 8, comprising:
in the second mode, a color decrease circuit for converting input image data of a plurality of bits into the prescribed number of bits and subjecting the color decrease process, to produce the color decreased bits as the part of the plurality of bits.

10. A display driver as claimed in claim 9, wherein the color decrease circuit is structured by a dither circuit for carrying out a dither process.

11. A display driver as claimed in claim 1, comprising:
in the second mode, a processing circuit for subjecting, to a predetermined process, input image data of the plurality of bits or for subjecting, to the predetermined process, image data given from color decrease circuit, to output the part of the plurality of bits.

12. A display driver as claimed in claim 1, comprising:
in the second mode, a processing circuit for storing the image data of the plurality of bits input as the part of the plurality of bits stored in the memory area, into the empty area or for storing the image data that is output from the color decrease circuit and that is subjected to the predetermined process, into the empty area as the part of the plurality of bits.

13. A display driver as claimed in claim 1, wherein the memory area is divided into a plurality of subdivided memory areas by a division number;
in the first mode, the image data formed by the plurality of bits being divided into a desired number of bits by a number corresponding to the division number and the whole of the image data divided into the desired number of bits is stored in the plurality of the subdivided memory areas;
in the second mode, either one of the subdivided memory areas being selected to store the part of the image data formed by the plurality of bits.

14. A display driver as claimed in claim 1, wherein the memory area is divided into a first divided memory area and a second divided memory area;
in the first mode,
the image data formed by the plurality of bits being equally divided in the first mode into high and low order bits for a plurality of bits representative of the number of gradation levels;
the high order bits of the image data among the plurality of bits divided being stored in the first divided memory area while the low order bits of the image data of the image data among the plurality of bits divided are stored in the second divided memory area;
in the second mode,
the high order bits of the image data formed by the plurality of bits being used as the part of the image data formed by the plurality of bits and selectively stored in the first divided memory area or the second divided memory area.

15. A display driver as claimed in claim 1, wherein, in the case of controlling two display screens, in the first mode, the memory control circuit uses the whole of the plurality of bits stored in the memory area to display on either one of the two display screens;
in the second mode, the memory control circuit using the part of the plurality of bits stored in the memory area to display on at least one of the display screens.

16. A display driver as claimed in claim 1, wherein, in the first mode, the memory control circuit reads out the whole of the image data stored in divided memory areas as image data used for displaying;
in the second mode, the memory control circuit reading out the image data stored in either one of the divided memory areas as high order bits of the image data used for displaying and, in addition, using the same data as the readout data, the part of the readout data, or predetermined desired data as low order bits of the image data used for displaying.

17. A display driver as claimed in claim 1, comprising:
a first judgment circuit for controlling the first and the second modes by comparing the input image data of the plurality of bits with the memory capacity of the memory area.

18. A display driver as claimed in claim 17, comprising:
a second judgment circuit for controlling the first and the second modes by judging whether or not the input image data of the plurality of bits are subjected to a predetermined process.

19. A display driver as claimed in claim 1, wherein the first and the second modes are controlled by a mode selection signal given from an external circuit.

20. A display driver as claimed in claim 1, wherein, in the second mode, the memory control circuit controls a bit width of the part of the plurality of bits in response to a bit number selection signal.

* * * * *